(12) United States Patent
Yang et al.

(10) Patent No.: US 11,144,022 B2
(45) Date of Patent: Oct. 12, 2021

(54) SYSTEM AND METHOD FOR MONITORING AND CONTROLLING ELECTRICAL LOADS

(71) Applicant: Eaton Intelligent Power Limited, Dublin (IE)

(72) Inventors: Yi Yang, Arvada, CO (US); Mikhail Goykhman, Reseda, CA (US); David W. Ganger, Lakewood, CO (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/781,237

(22) Filed: Feb. 4, 2020

(65) Prior Publication Data

US 2020/0249647 A1 Aug. 6, 2020

Related U.S. Application Data

(60) Provisional application No. 62/800,669, filed on Feb. 4, 2019.

(51) Int. Cl.
*G05B 19/042* (2006.01)
*H02J 3/14* (2006.01)
*G05B 15/02* (2006.01)
*G05F 1/66* (2006.01)

(52) U.S. Cl.
CPC ......... *G05B 19/042* (2013.01); *G05B 15/02* (2013.01); *G05B 2219/2639* (2013.01); *G05F 1/66* (2013.01); *H02J 3/14* (2013.01)

(58) Field of Classification Search
CPC ... H02J 3/14; G05F 1/66; G05B 15/02; G05B 19/042; G05B 2219/2639
See application file for complete search history.

(56) References Cited

U.S. PATENT DOCUMENTS

| 8,433,452 | B2* | 4/2013 | Fleck | H02J 3/14 |
| | | | | 700/296 |
| 8,756,181 | B2 | 6/2014 | Lu et al. | |
| 8,918,346 | B2 | 12/2014 | Lu et al. | |
| 9,287,710 | B2* | 3/2016 | Talkin | G06Q 50/06 |
| 9,410,996 | B2 | 8/2016 | Du et al. | |
| 9,442,999 | B2 | 9/2016 | Yang et al. | |
| 9,767,415 | B2* | 9/2017 | Ito | G06Q 50/06 |
| 9,866,021 | B2 | 1/2018 | Yang et al. | |

(Continued)

*Primary Examiner* — Ronald D Hartman, Jr.
(74) *Attorney, Agent, or Firm* — Fishman Stewart PLLC

(57) ABSTRACT

A method of monitoring an electrical system having a plurality of electrical loads may include operating the plurality of electrical loads, obtaining a combined power profile for the plurality of electrical loads, decomposing the combined power profile into individual electrical load profiles from the combined power profile, and controlling operation of one or more electrical loads of the plurality of electrical devices according to the individual electrical load profile of the one or more electrical loads. Decomposing the combined power profile may include applying multi-dimensional event decomposition to the combined power profile to identify and disaggregate the combined power profile into the individual electrical load profiles. Decomposing the combined power profile may include detecting power consumption events of the plurality of electrical loads. Decomposing the combined power profile may include classifying the detected power consumption events.

20 Claims, 22 Drawing Sheets

(56) References Cited

U.S. PATENT DOCUMENTS

| | | |
|---|---|---|
| 10,290,063 B2 | 5/2019 | Yang et al. |
| 10,325,150 B2 | 6/2019 | Lu et al. |
| 2013/0138669 A1 | 5/2013 | Lu et al. |
| 2014/0371932 A1* | 12/2014 | Yang ................. G01D 4/00 700/291 |
| 2015/0081127 A1* | 3/2015 | Bhageria ............ H02J 13/00 700/295 |
| 2016/0116508 A1 | 4/2016 | Yang et al. |
| 2016/0156225 A1 | 6/2016 | Yang et al. |
| 2017/0116686 A1* | 4/2017 | Fujita ................. H02J 3/32 |
| 2019/0324415 A1* | 10/2019 | Frolik ............ H02J 13/0006 |
| 2020/0132735 A1 | 4/2020 | Yang et al. |
| 2020/0249647 A1 | 8/2020 | Yang et al. |
| 2020/0310479 A1* | 10/2020 | Worth ................. H02J 3/32 |

\* cited by examiner

SYSTEM AND METHOD FOR MONITORING AND CONTROLLING ELECTRICAL LOADS

CROSS-REFERENCE TO RELATED APPLICATION

This application claims the benefit of U.S. Provisional Patent Application Ser. No. 62/800,669, filed on Feb. 4, 2019, the disclosure of which is hereby incorporated by reference in its entirety as though fully set forth herein.

TECHNICAL FIELD

The present disclosure generally relates to electrical systems and methods, including electrical systems and methods for monitoring and controlling electrical loads, such as electrical loads of a home or an aircraft.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Intelligent electrical load control and management, such as for buildings and/or vehicles (e.g., aircraft) can be significant for functionality such as energy consumption monitoring, fault identification, load health status, preventing nuisance trips, improving arc fault detection, vampire load detection, as well as notification of load malfunction. This can be particularly important in light of aircraft becoming more electric and more connected with new "smart" devices.

Being able to know health and other parameter breakdowns by individual loads/appliances on an aircraft may be valuable to manufacturers and/or to end users, such as airlines, consumers, etc. This information may enable more targeted, optimized control/use of electricity, load shedding via demand response, and prognostics/diagnostics of loads, etc.

With aircraft, as an example, individual sensing for every device/appliance may be the most straightforward approach to provide load-specific health monitoring and power usage. However, a system with distributed and individual sensors often requires extensive installation efforts, may be inefficient (e.g., space, weight, etc.) and is often expensive and difficult to install, operate, and/or maintain (and may be relatively heavy).

Nonintrusive Appliance Load Monitoring (NIALM), on the other hand, may address one or more of the above issues, and may obtain the load-specific data by disaggregating/decomposing the total power consumption that is measured at the power-main level. Existing designs have not been effective in a number of real-world applications.

There is a desire for solutions/options that minimize or eliminate one or more challenges or shortcomings of systems and methods of monitoring and controlling electrical loads. The foregoing discussion is intended only to illustrate examples of the present field and is not a disavowal of scope.

SUMMARY

In embodiments, a method of monitoring an electrical system having a plurality of electrical loads may include operating the plurality of electrical loads, obtaining a combined power profile for the plurality of electrical loads (e.g., from a central location/power main), decomposing the combined power profile into individual electrical load profiles from the combined power profile, and/or controlling operation of one or more electrical loads of the plurality of electrical devices according to the individual electrical load profile of the one or more electrical loads. Decomposing the combined power profile may include applying multi-dimensional event decomposition to the combined power profile to identify and disaggregate the combined power profile into individual electrical load profiles. Decomposing the combined power profile may include detecting power consumption events of the plurality of electrical loads. Decomposing the combined power profile may include classifying the detected power consumption events. Classifying the detected power consumption events may include event clustering and association of the detected power consumption events of each electrical load of the plurality of electrical loads. Decomposing the combined power profile may include applying progressive load classification and decomposition. The method may be configured for automatically tracking electrical configurations.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
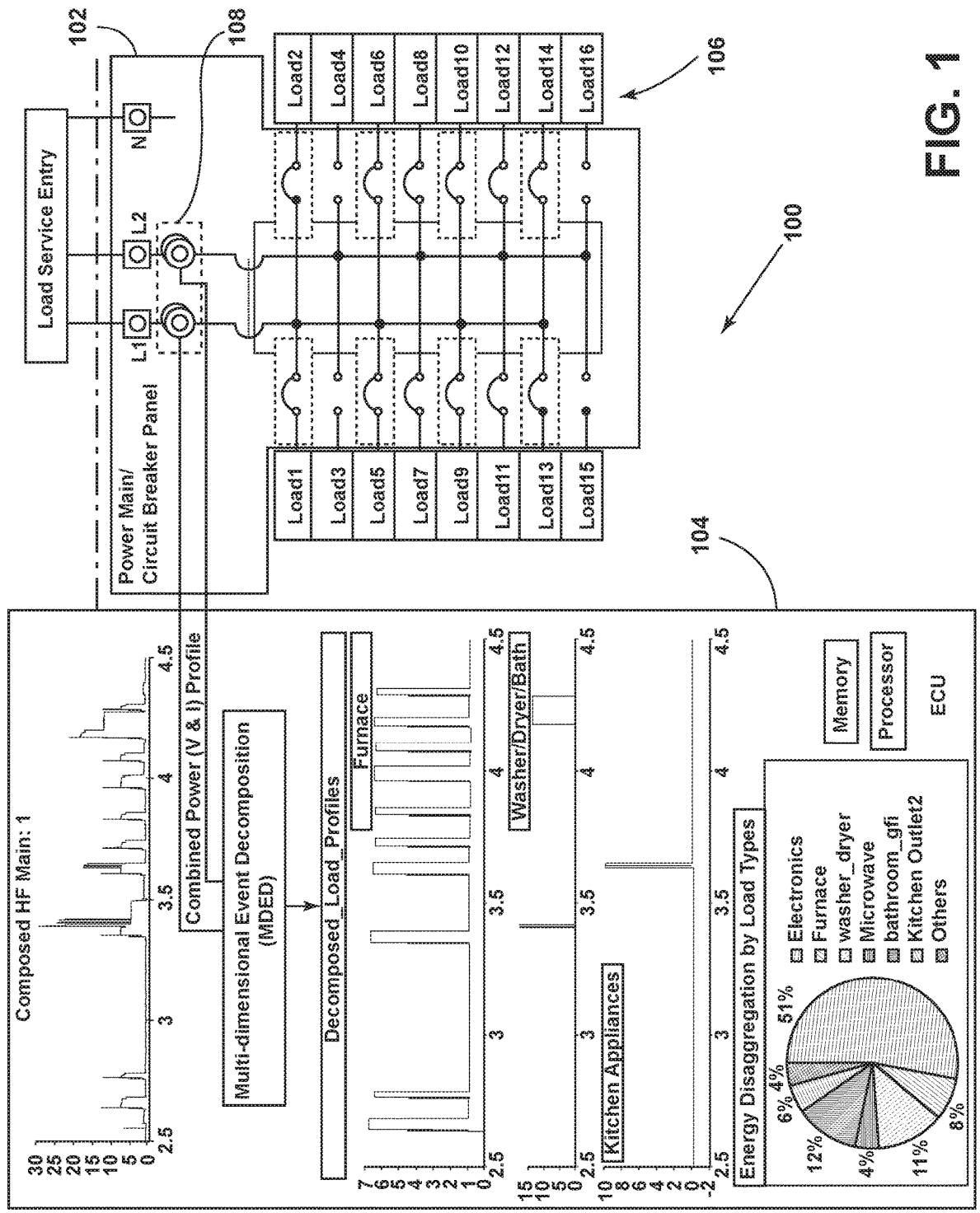
FIG. 1 is a schematic view generally illustrating an embodiment of an electrical system according to teachings of the present disclosure.

In embodiments, such as generally illustrated in FIG. 1, an electrical system 100 may include an electronic control unit (ECU) 102, a power source/main 104 (e.g., a circuit breaker panel/electrical box), and/or a plurality of loads 106 (e.g., electrical devices/appliances) that may be connected to the power source/main 104. The ECU 102 may be configured to monitor the electrical system 100, such as via a sensor 108 that may be configured to obtain a combined electrical profile (e.g., a voltage and/or current waveform) from the power source 104 for the plurality of electrical loads 106, such as at or about a combined entrance of the power source 104. The sensor 108 may, for example and without limitation, include a current sensor and/or a voltage sensor. A single sensor 108 (e.g., as opposed to individual sensors each obtaining a separate profile for each separate load) may, for example and without limitation, be configured to obtain the combined electrical profile.

Figure 2:
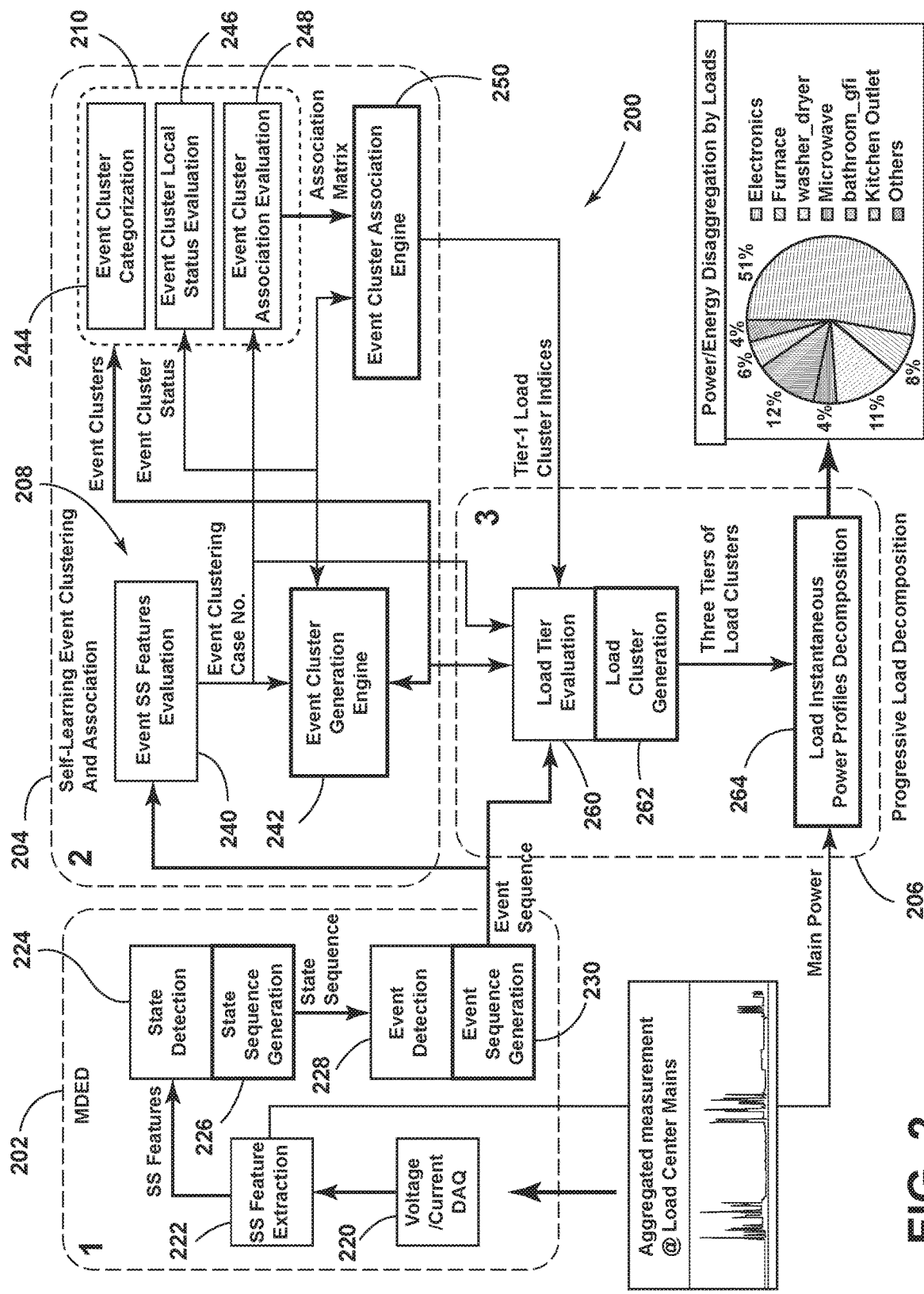
FIG. 2 is a graphical view generally illustrating current draw of electrical loads of an embodiment of an electrical system according to teachings of the present disclosure.

In embodiments, such as generally illustrated in FIG. 2, the ECU 102 may be configured to implement a method 200 of monitoring/controlling the electrical system 100. The method 200 may include a Nonintrusive Appliance Load Monitoring (NIALM) configuration and may be referred to herein as a multi-dimensional event decomposition (MDED) method. The method 200 may be utilized to decompose/disaggregate the total power usage measured at a particular location (e.g., the power source/main 104), such as down to the power usages at an individual load level. With embodiments, voltage and current waveforms may be measured (e.g., via the sensor 108) at the power source/main 104 (e.g., at load center mains and/or circuit breakers inside a load center panel), such as generally illustrated in FIG. 1.

With embodiments, the method 200 may include applying multi-dimensional feature extraction to measured voltage and current signals. This approach may enable an effective classification and decoupling of events detected upon the switching (e.g., on/off) of various loads 106. The ECU 102 may identify multiple event sequences for multiple individual loads 106 in use. These decoupled event sequences may then be used by the ECU to reconstruct the individual load power usage profile and energy consumption. In embodiments, such as generally illustrated in FIG. 2, the method 200 may include (i) MDED 202, (ii) self-learning event clustering and association by individual load 204, and/or (iii) progressive load classification and decomposition to disaggregate instantaneous power usages by loads 206.

In embodiments, the method 200 may not only be able to decompose/breakdown the measured instantaneous power and total consumed energy into power and energy usages by individual loads 106 of an electrical system 100 (e.g., in an aircraft), but may also be able to auto-recover from short-term failures (e.g., a failure to detect an event) without causing accumulated errors in the disaggregation result.

Figure 3:
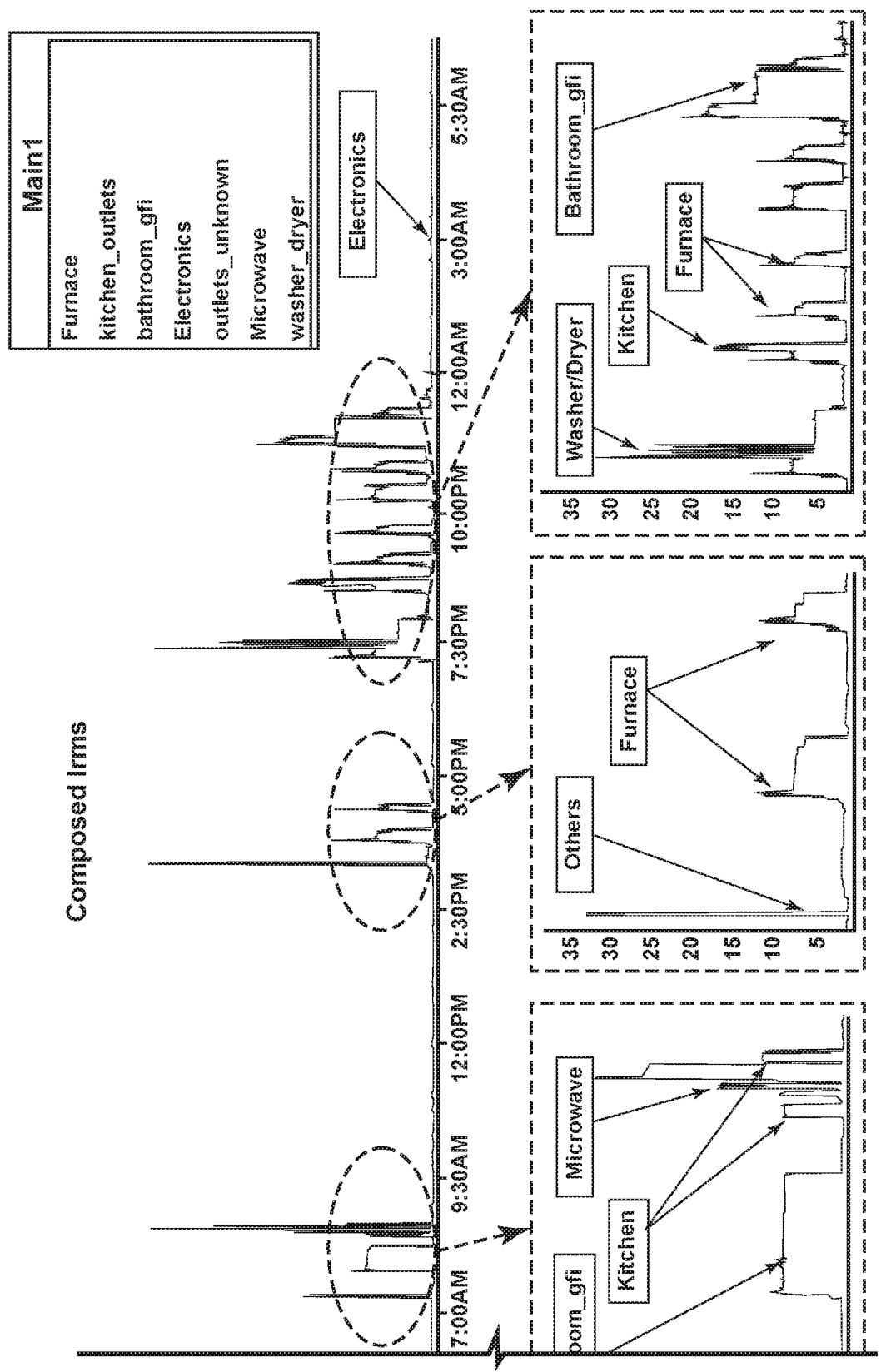
FIG. 3 is a flow diagram generally illustrating an embodiment of a method of monitoring an electrical system according to teachings of the present disclosure.

With embodiments, the method 200 may be used in connection with home/aircraft load disaggregation. FIG. 3 generally illustrates an example of a one-day snapshot of current RMS profile measured at a power source 104 (e.g., load center main) of an example of an electrical system 100 (e.g., a home/aircraft). The figure also depicts how a current RMS value may change with respect to different load ON/OFF events. As generally illustrated, there may be many (e.g., more than one hundred) use events happening in an electrical system 100 (e.g., a home/aircraft) within a period of time (e.g., a day). Some or most of the time, multiple loads 106 may be in use at the same time. This may present a challenge for effective load disaggregation.

In embodiments, decomposing the main power usage into the usage by individual load 106 may include effectively detecting load ON/OFF events, such as via detecting changes in power consumption and/or other electrical characteristics. Another step may include classifying detected events by individual load 106 (e.g., clustering and associating all of the events caused by the same load 106) (block 204). Successful association of events of a particular load 106 may be useful to decouple/decompose the power usage of a load 106 from others. If there is no prior information available when the method 200 is initiated, event clustering and association 204 may rely on a self/online/continuous/iterative learning process, in which characteristics and usage behavior of loads 106 may be learned over time for the electrical system 100 (e.g., the particular home or aircraft) with which the method 200 is applied.

With embodiments, the method 200 may be configured to handle system uncertainties to prevent accumulated disaggregation errors. One scenario in which errors may arise is when online learning has not established enough statistical significance (e.g., not enough event occurrences) to enable an effective event association and classification 204. The method 200 may conduct progressive load classification and decomposition 206, which may depend on the availability of learned information. Errors may also include misdetection of events and/or unwanted detection of events. The method 200 may be configured to acknowledge and recover from these events/circumstances to prevent accumulated disaggregation errors.

In embodiments, the method 200 may address one or more issues described above. A block diagram of an embodiment of the method 200 is generally illustrated in FIG. 2.

With embodiments, the ECU 102 may utilize MDED 202 to detect load ON/OFF events. Voltage and/or current data may be acquired (block 220) and/or steady-state (SS) features may be extracted (block 222). MDED 202 may include a first phase and/or a second phase. The first phase may include state detection for state sequence generation 224. A state may be defined as a status when steady state (SS) features variation changes less than a threshold amount/percentage (e.g., 10%). The second phase may include event detection for event sequence generation 230. An event may be defined as a status when a state duration is longer than a threshold time (e.g., 10 seconds).

In embodiments, the ECU 102 may utilize self-learning event clustering and association 204 to classify some or all detected events by individual load 106 and may include a first stage of learning 208 and/or a second stage of learning 210. The first stage of learning 208 may include event clustering, which may include evaluating event SS features 222 and/or event cluster generation 242. An event cluster may be defined as a group of events that have similar event features or characteristics. Event clustering may begin as soon as the method 200 begins and/or as soon as the electrical system 100 is activated/turned on and may continue while the system 100/method 200 operate. Event clustering may involve two measurement metrics. The first measurement metric may be a Mahalanobis distance, by event SS features, between a newly detected event and existing event clusters. The second measurement metric may be a transition matrix, by an event of the same event cluster transition (e.g., load ON/OFF transition) sequence. When a first stage statistical significance condition is satisfied (e.g., after one week of first stage learning), depending on whether the event cluster (status) has been confirmed, the event cluster can start the second stage of learning 210 and/or continue with first stage of learning 208.

With embodiments, the second stage of learning 210 (e.g., event cluster evaluation) may include event cluster association for Tier-1 load cluster generation. A Tier-1 load cluster may include a group of one or multiple event clusters that belong to one load and have been associated. The Tier-1 load cluster may represent the characteristics of this learned load. Tier-1 load clusters may be maintained/stored by the ECU 102 to provide the guidelines to decompose the instantaneous power for some or all of the loads 106 that have been successfully learned through first stage learning 208 and second stage learning 210. Event cluster association, which may be utilized as for second stage learning 210 (and may be referred to herein as event cluster association 210), may start after a first stage statistical significance condition is satisfied. Event cluster association 210 may involve a first measurement metric and/or a second measurement metric. The first measurement metric may include an adjacent matrix of adjacent events (e.g., two events that happen in sequence) occurrence statistics. The second measurement metric may include an association matrix that may be used to evaluate to what degree two event clusters are associated, such as via adjacent occurrence statistics. If a second stage statistical significance condition is satisfied (e.g., after a period of time, such as one month of second stage learning), depending on whether the event cluster (e.g., status) can be associated, the event cluster may be registered into a Tier-1 load cluster and/or second stage learning 210 may continue.

With embodiments, the method 200 may include progressive load classification/decomposition 206 that may be configured to disaggregate instantaneous power usages by load cluster tiers and/or load clusters. The method 200 may include maintaining multiple (e.g., 7 or 10) load clusters and using the maintained clusters to breakdown the main power usage into multiple (e.g., 7 or 10) power profiles. Each power profile may represent the disaggregated power usage for one load cluster. Load cluster tiers may be utilized to disaggregate main power progressively depending on the availability of information, such as information provided via the above learning processes. Load clusters may, for example, be categorized into tiers, such as Tier-1, Tier-2, and Tier-3.

In embodiments, Tier-1 load clusters may be device-level load clusters, which may be derived/learned through event clustering and association 204. Tier-1 load clusters may decompose power and energy down to the granular level of individual loads 106 (e.g., water heater, furnace, microwave, etc.). The number of Tier-1 load clusters registered may depend on the number of loads that have been learned through first stage learning 208 and second stage learning 210. In other words, the longer the method 200 is implemented (or, the longer the method 200 has learned the behavior of the loads or the more information provided to the ECU 102 about the behavior of the loads 106), the more load clusters can be registered as Tier-1 appliance clusters.

With embodiments, Tier-2 load clusters may be category-level load clusters, which may be configured to decompose power and energy down to the granular level of load categories (e.g., Resistive or R-category, Reactive or X-category, Electronic or E-category, etc.). A Tier-2 load cluster may be defined as a group of event clusters that have been confirmed through a first stage learning 208 and may share the event SS features of a load category. The number of Tier-2 load clusters may correspond to the number of load categories (e.g., three in the illustrated embodiment of the system 100).

In embodiments, Tier-3 load clusters may be defined as an "Other Load" cluster, which may include all of the detected events that may not yet be classified into either Tier-1 or Tier-2 load clusters. For example and without limitation, detected events may be assigned into the Tier-3 load cluster when the system 100/method 200 is initially implemented (e.g., if a learning process has not established enough statistical significance).

Figure 18A:
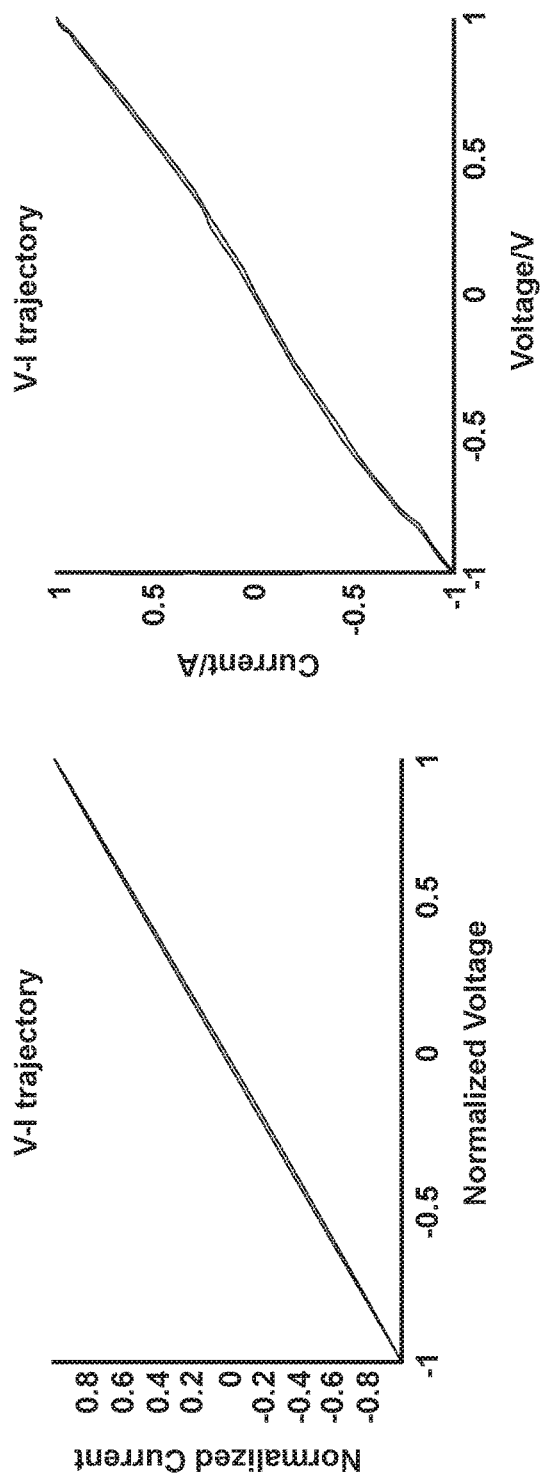
FIGS. 18A, 18B, and 18C are graphical representations generally illustrating current and voltage profiles of resistive, reactive, and electronic loads, respectively.
Figure 18B:
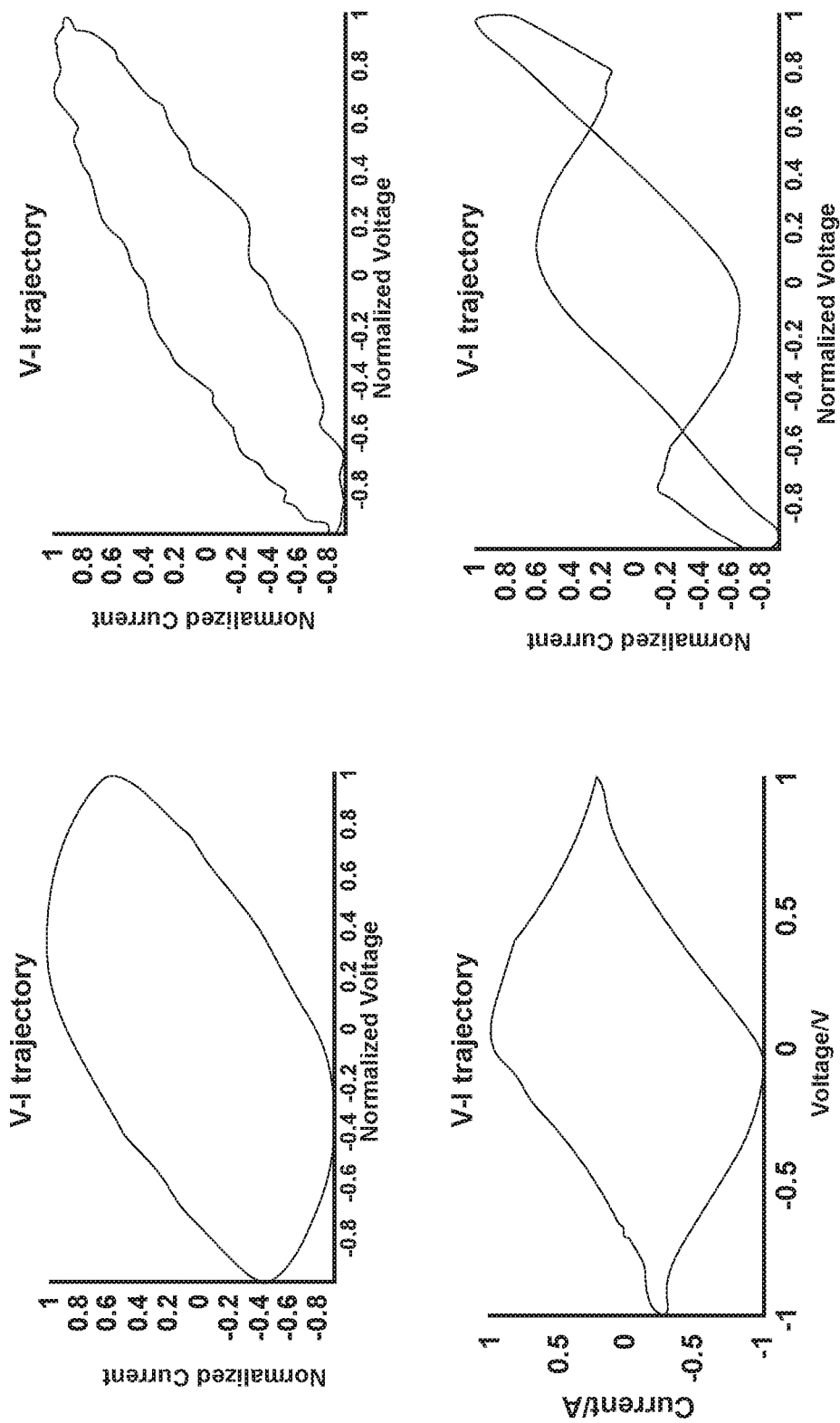
Figure 18C:
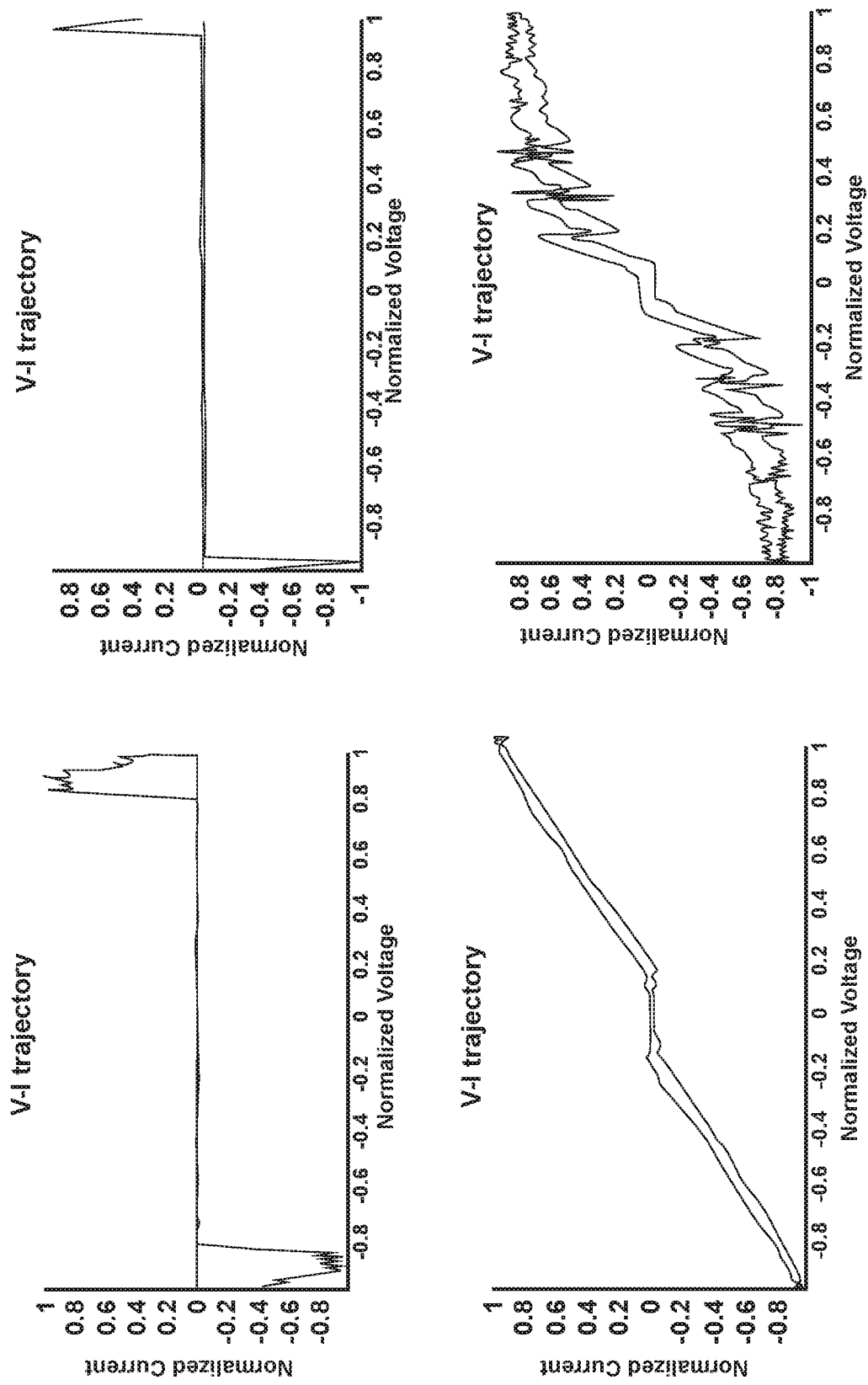

With embodiments, such as generally illustrated in FIGS. 18A-18C, loads 106 may be categorized into three major categories based on their front-end topologies. A first category (e.g., an R-category) may include resistive loads, such as, for example and without limitation, incandescent lights, water heaters, stoves, irons, electric skillets, and/or space heaters, among others. A second category (e.g., an X-category) may include reactive loads, such as, for example and without limitation, space fans, furnaces, and/or refrigerators, among others. A third category (e.g., an E-category) may include electronic loads, such as, for example and without limitation, LED (light emitting diode) lights, computers, and/or televisions, among others.

In embodiments, the method 200 may include load cluster tier evaluation and/or load disaggregated power assessment. When a new event is detected, a load cluster tier level and/or a load cluster index may be determined for the new event. The instantaneous power for this event may be added into the disaggregated power profile maintained for the corresponding load cluster. The disaggregated power profiles of some or all of the load clusters may be updated (e.g., continuously) over time. Through the event clustering and association 204 (e.g., online learning) and progressive load classification/power decomposition 206, the system 100 may gradually increase the number of Tier-1 load clusters (e.g., learned loads), and increase the percentage of main power usage that can be decomposed down to the granular level of individual loads 106.

With embodiments, such as generally illustrated in FIG. 2, the method 200 may include voltage/current data acquisition 220 (e.g., via the sensor 108), steady-state (SS) feature extraction 222, state detection 224, and/or state sequence generation 226. State may be measured by a set of steady-state features of main voltage and current, such as listed in Table 2 below.

TABLE 2

Steady State Features

| # | SS Feature | Descriptions |
|---|---|---|
| F1 | Power | Real power |
| F2 | I1 | Fundamental current RMS |
| F3 | Theta 1 | Fundament current Phase Angle |
| F4 | I3 | $3^{rd}$ order current harmonic RMS |
| F5 | Theta3 | $3^{rd}$ order current harmonic Phase Angle |
| F6 | I5 | $5^{th}$ order current harmonic RMS |
| F7 | THD > 5 | Total harmonic distortion percentage with harmonics order larger than $5^{th}$. |

In embodiments, the ECU 102 may detect a new state if the system 100 observes a significant change in one or more SS features=[F1, F2, . . . F7] (e.g., a change larger than a state detection threshold which may, for example, be about 10%). For example and without limitation, with a baseline load running, when a load 106 is turned ON or OFF, one or more SS features may change as a result of the addition/removal of this load 106, and this change may result in a new state. The SS feature variation may be measured by Manhattan distance (see, e.g., Equation 1):

$$\Delta SSfeature(j)=ManhattanDistance(SSFeature(j)-SSFeature(j-1)) \quad \text{Eq. 1.}$$

With embodiments, the system 100 (e.g., the ECU 102) may include a non-linear function that may be introduced to ensure that a state change larger than the threshold value can be detected even with high baseline value.

In embodiments, the system 100 may include a noise-suppression process that the ECU 102 may be configured to implement to mitigate unnecessary state changes caused by noises, particularly when the baseline values are smaller than the lower bound values. This state detection process 224 may result in a quantized state sequence. Information maintained for each detected state may include state duration, state SS features mean, and/or state SS features variance.

Figure 4:
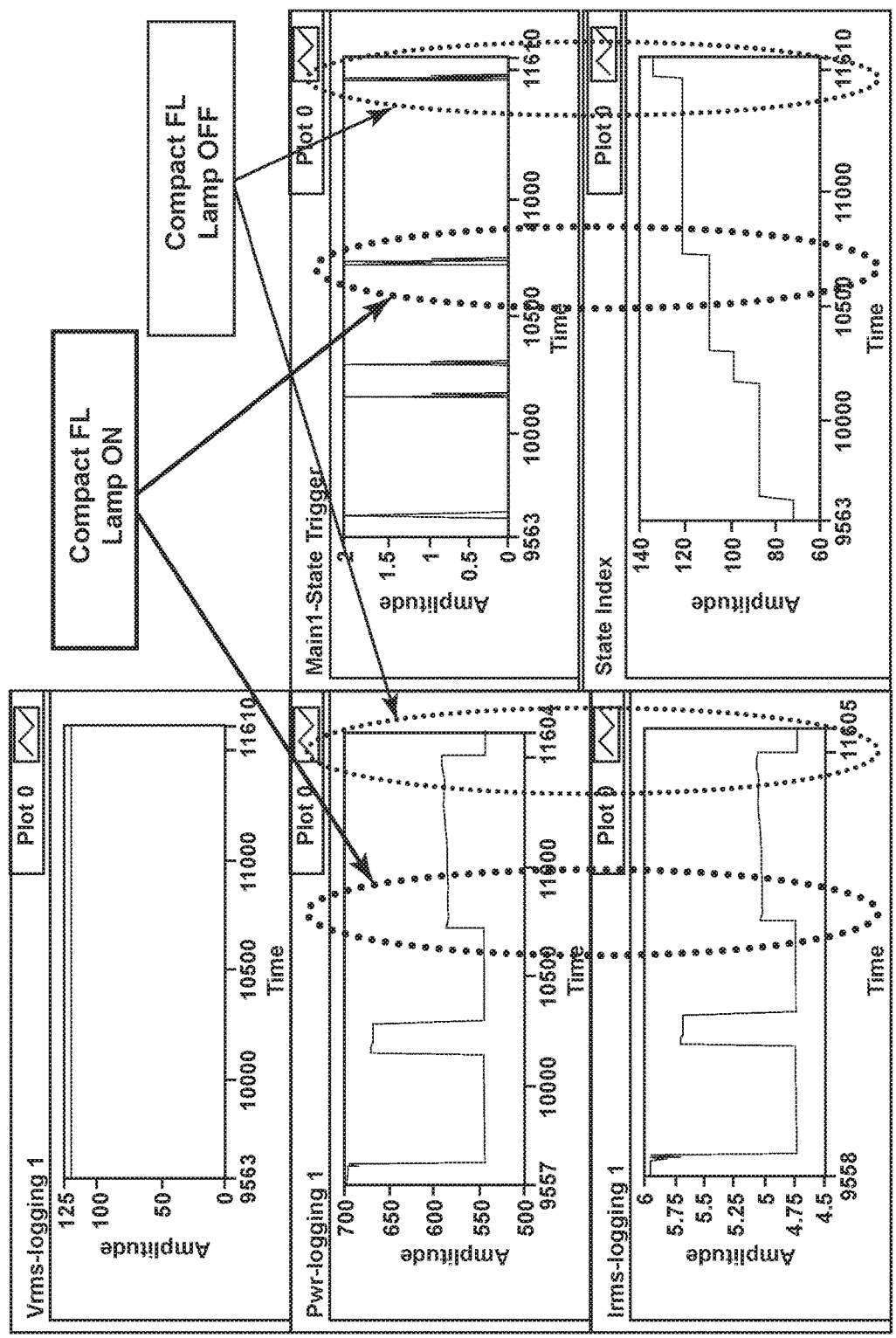
FIG. 4 is a graphical view generally illustrating current draw of electrical loads and state detection associated therewith for an embodiment of an electrical system according to teachings of the present disclosure.

In embodiments, using multi-dimensional features to detect states may increase sensitivity. The detection of a new state may not rely only on the power change, but may also use other characteristics associated with current change. FIG. 4 generally illustrates an example of turning ON and OFF a compact fluorescent (CFL) lamp (e.g., a 35 W lamp) with a baseline load of around 550 W. The power change percentage may be about 6.4%, which may be less than a state detection threshold (e.g., 10%). However, two new states may be successfully detected with multi-dimensional features considered, as shown through the state triggering and state index signals.

Referring again to FIG. 2, in embodiments, the method 200 may include event detection 228 and/or event sequence generation 230. Events may be defined as changes in power consumption and/or other electrical characteristics caused by turning ON/OFF various loads. Effective event detection 228 may facilitate load disaggregation 206. Measured main current waveforms may be noisy and may fluctuate. This waveform fluctuation may not always be caused by turning ON/OFF a load 106. Therefore, the state and state change detection may not always lead to a successful event detection. The system 100/method 200 may include an event detection delay threshold. When the state duration of a state is longer than the event detection delay threshold, which may, for example and without limitation, be about 10 seconds, a new event may be detected. An event sequence, which may include some or all events that has been detected, may be generated and maintained (e.g., in block 230). Information maintained for some or all detected events may include:

Event Duration: The duration that this event lasts till another event happens;

Event Sign: Positive event (ON event); Negative event (OFF event);

Event SS Features: The steady state features for the detected event; and/or

Average Event Waveform: The averaged current waveform for the detected event.

Figure 5:
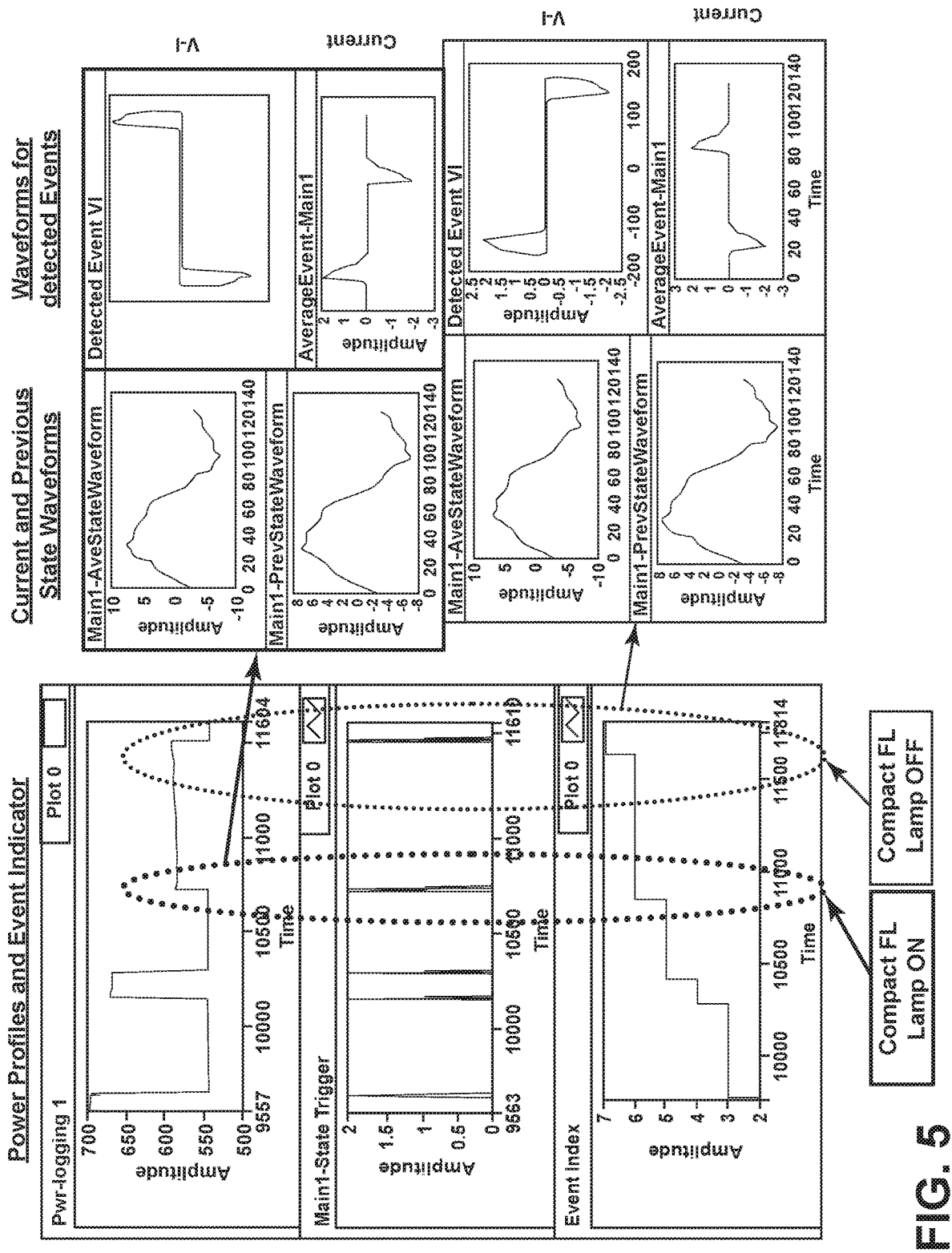
FIG. 5 is a graphical view generally illustrating current draw of electrical loads and event detection associated therewith for an embodiment of an electrical system according to teachings of the present disclosure.

With embodiments, the event average waveform may be the difference between the state average waveform of the current state (already detected as event) and the state average waveform of the previous state (detected as an event). Event SS features (e.g., [PowerH, I1, Theta1, I3, Theta3, PowerL, THD]) may be extracted from the average event waveform. FIG. 5 generally illustrates a sample case for event detection for when a CFL lamp is turned ON and OFF. Because the state durations are both longer than 10 seconds, the event index may increment by one upon a new state being triggered (with a 10-second delay). The subtracted waveforms (voltage-current trajectory and cycle current waveform) are shown for both events. The two sets of waveforms are reversed, which reflect whether an event is an ON event or an OFF event. The state average waveforms for the current and previous states are also shown in FIG. 5.

Figure 6:
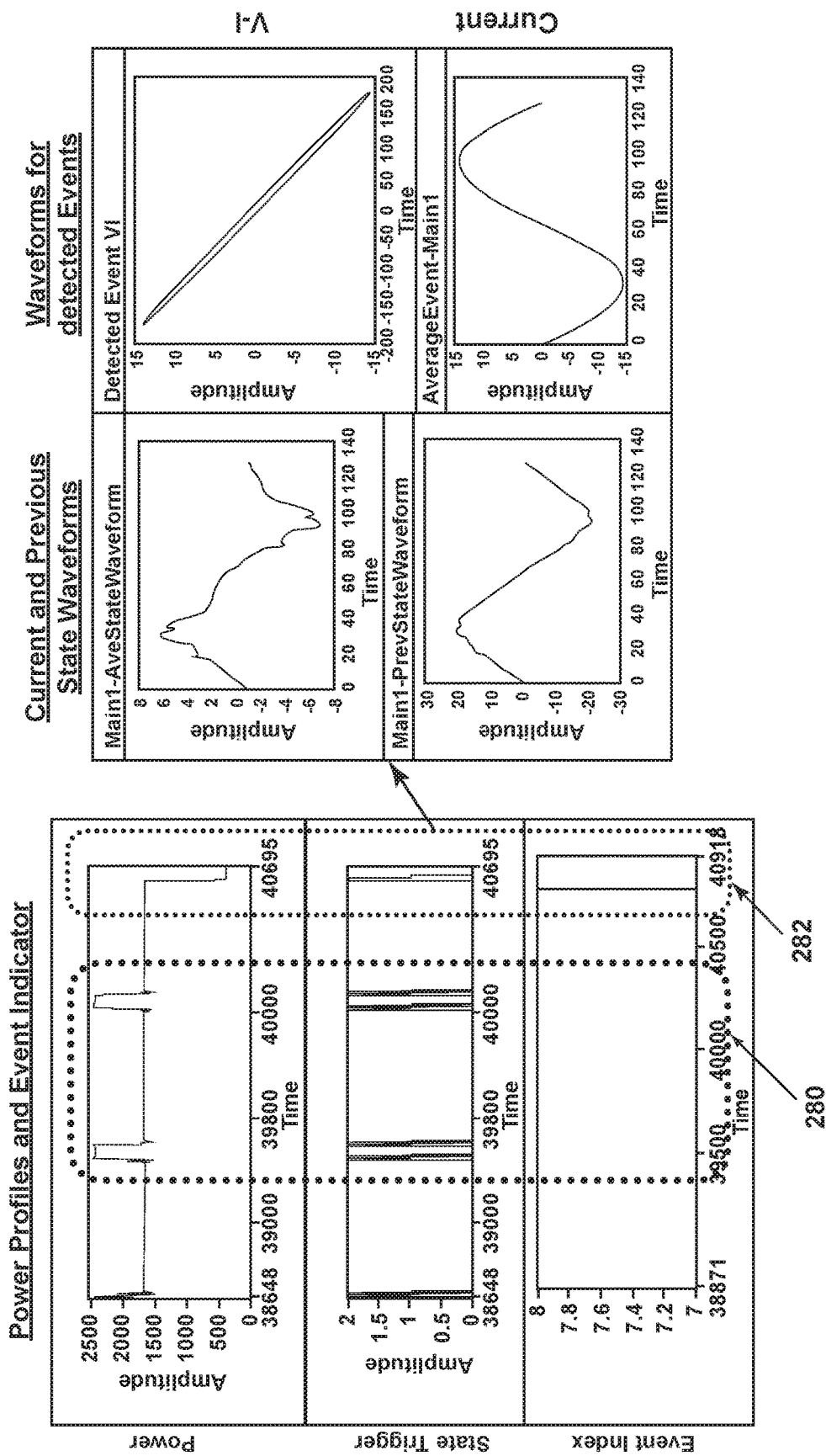
FIG. 6 is a graphical view generally illustrating current draw of electrical loads and event detection associated therewith for an embodiment of an electrical system according to teachings of the present disclosure.

FIG. 6 generally illustrates another example with a load 106 (e.g., a cooking oven) in use and then turned OFF. This example intends to demonstrate that not every state change will lead to a new event being detected. The power fluctuations during a first period 280 are detected as two state changes but are not detected as new events because the state durations are not long enough. However, the turning OFF event during period 282 is successfully captured as an actual appliance event.

With embodiments, such as generally illustrated in FIG. 2, the method 200 may include first stage learning 208 (e.g., event clustering). An event cluster may be defined as a group of events with one or more similarities. The similarities may be measured by Mahaloanobis distance (e.g., based on event SS features) from a newly detected event to all existing event clusters. If the distance to one existing event cluster is less than an event clustering threshold (e.g., 15), the ECU 102 may assign the new event to this event cluster. If the distances to all the existing event clusters are larger than the threshold, the ECU 102 may create a new event cluster for this new event. This process may be referred to as event self-clustering. Self-clustering may group all events belonging to the same load, and obtain the feature statistics by these groups of events (event clusters).

Figure 7:
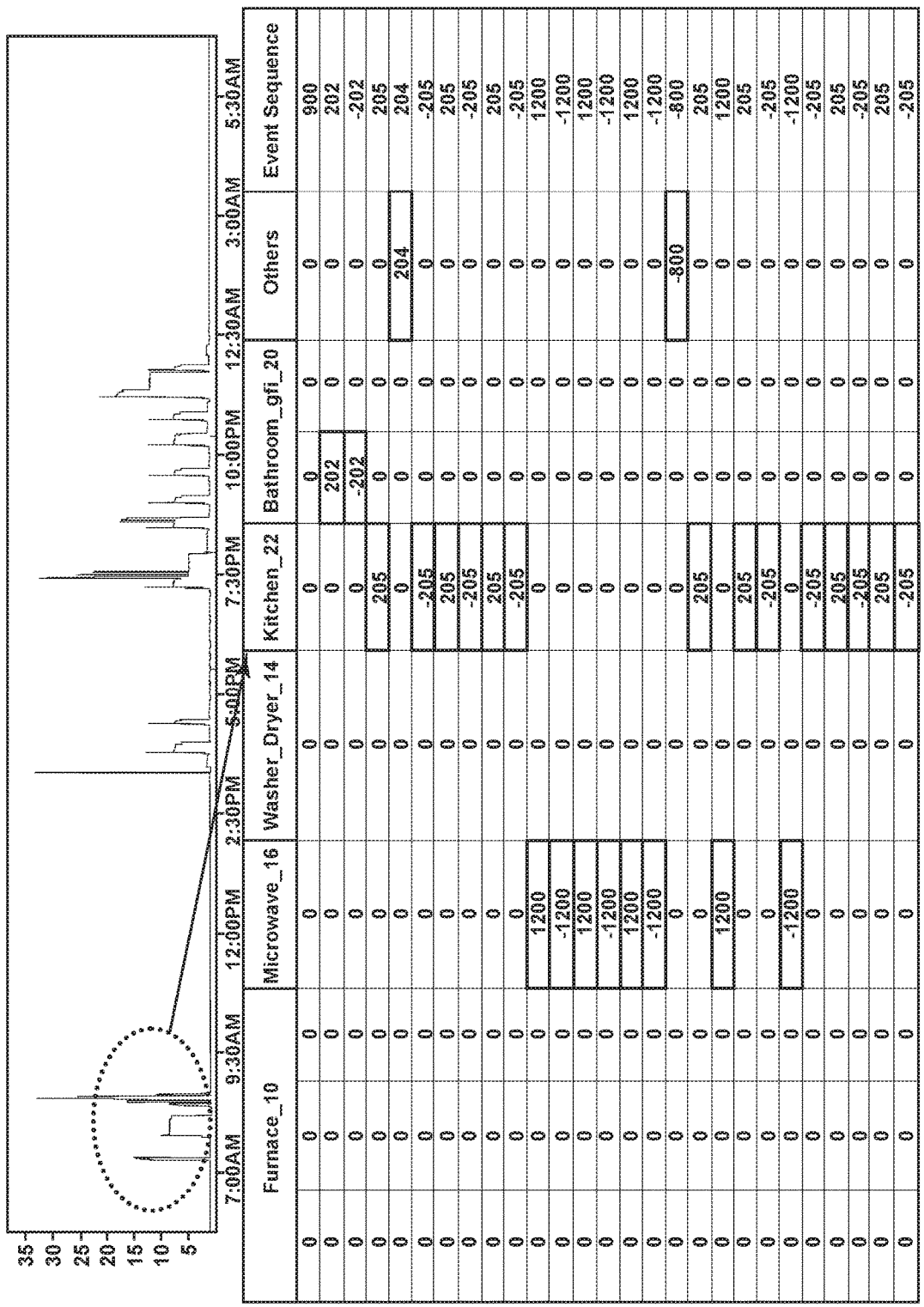
FIG. 7 is a graphical view generally illustrating power consumption of electrical loads and event clustering associated therewith for an embodiment of an electrical system according to teachings of the present disclosure.

FIG. 7 demonstrates an example of how detected events may be related to event clusters. The right column represents a generated event sequence during the hours from 7:00 AM until 8:30 AM. Each of other columns represents the events caused by a respective load 106 over time (e.g., furnace, microwave, washer/dryer, kitchen outlet, bathroom outlet/GFI, others, etc.). One event cluster may represent the common feature statistics of the events that belong to the same column.

In embodiments, the method 200 may maintain multiple event clusters. Upon the detection of a new event, the event cluster generation engine 242 may update these event clusters. The objectives of maintaining an event cluster may include one or more of:

Event cluster SS features statistics assessment and updates (e.g., means, variances, etc.);

Event cluster categorization (e.g., Resistive-; Reactive-; and Electronic-category based on SS Features, see FIGS. 18A-18C);

Event cluster occurrence statistics (e.g., number of events happened for an event cluster);

Event transition matrix (e.g., to facilitate event cluster type assessment);

Event adjacent matrix (e.g., to facilitate event cluster association);

Event cluster type assessment (e.g., Paired, Positive, Negative, Sporadic, Baseline);

Event cluster local status assessment (e.g., Pending, Confirmed, Abandoned, such as to determine system learning stages); and/or Event cluster rearrangement (e.g., error handling to remove Abandoned events).

In embodiments, the method 200 may include an event cluster local status evaluation 246. Event cluster statuses (e.g., four statuses and an initial status) may include Initial, Pending, Confirmed, Independent/Associated, and/or Abandoned. The event cluster status may be utilized in determining and enabling different learning stages. Table 3 summarizes examples of learning execution and functions for each event cluster status.

TABLE 3

Learning Execution and Functions by Event Cluster Status

| Event Cluster Status | Learning Execution and Functions |
|---|---|
| Initial Status | Initialize all data structures of event cluster to default values |
| Pending | Continue with Stage-1 Learning (event cluster generation) |
| | Update Event Cluster Status as needed |
| Confirmed | Continue with Stage-1 Learning (event cluster generation) |
| | Enable and/or continue with Stage-2 Learning (event association) |
| | Update event cluster status as needed |
| Abandoned | Remove "Abandoned" event cluster from active event cluster indices |
| | Initialize all data structures of event cluster to default values |
| Associated/ Independent | Continue with Stage-1 Learning (event cluster generation) |
| | Continue with Stage-2 Learning (event association) |
| | Update event cluster status as needed |

As an example, a "Confirmed" event cluster status may trigger/enable second stage learning for event association.

Figure 8:
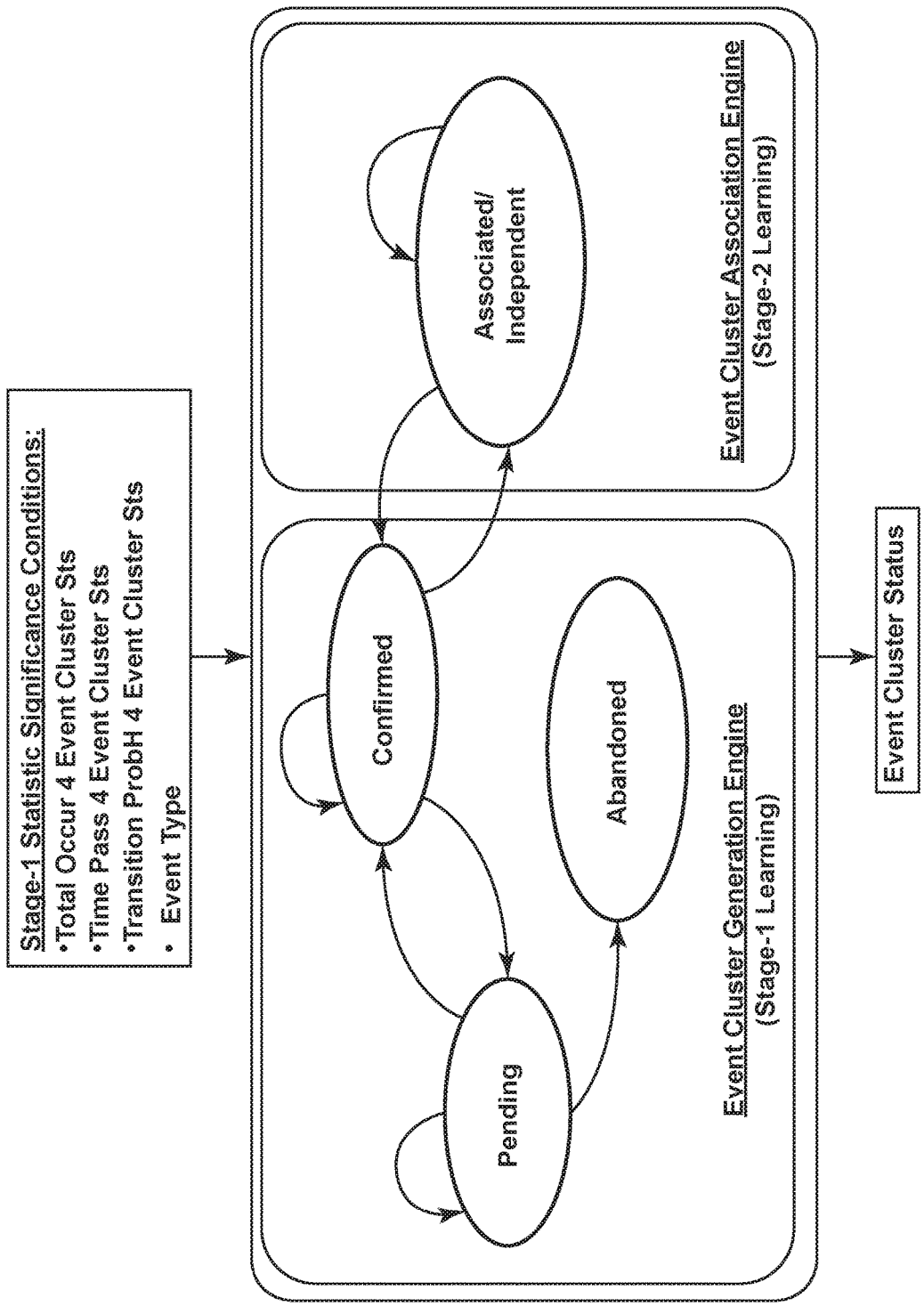
FIG. 8 is a flow diagram generally illustrating an embodiment of event clustering of a method of monitoring an electrical system according to teachings of the present disclosure.

FIG. 8 and Table 4 summarize examples of how the state of an event cluster may transition from one type to another and the corresponding transition conditions.

TABLE 4

Event Cluster Status Transitions and Conditions

| Previous | Event Cluster Status Transition Conductions | | | | Outcomes | |
|---|---|---|---|---|---|---|
| Event Cluster Status | Statistical Significance | Event Cluster Type | Combined Probability | Leading Event Type | Event Cluster Status | Confidence Level |
| — | NO | — | — | — | Pending | 50% |
| Pending | YES | Recognized | >90% | Leading | Confirmed | Transition Probability |
| Confirmed | YES | Recognized | >90% | — | Confirmed | Transition Probability |
| Confirmed | YES | — | 50%-90% | Leading | Pending | Transition Probability |
| Pending | YES | — | 50%-90% | — | Pending | Transition Probability |

TABLE 4-continued

Event Cluster Status Transitions and Conditions

| Previous Event Cluster Status | Event Cluster Status Transition Conductions | | | | Outcomes | |
|---|---|---|---|---|---|---|
| | Statistical Significance | Event Cluster Type | Combined Probability | Leading Event Type | Event Cluster Status | Confidence Level |
| Pending | YES | — | <50% | — | Abandoned | 10 |
| Independent | — | — | — | — | Independent | Unchanged |
| Associated | — | — | — | — | Associated | Unchanged |

With the embodiment generally illustrated in FIG. 8, for example, an event cluster with a pending status may transition from pending to abandoned (e.g., if a combined probability is less than about 50%), may remain pending (e.g., if a combined probability is between about 50% and about 90%), and may transition to confirmed (e.g., if a combined probability is greater than 90%).

Figure 9:
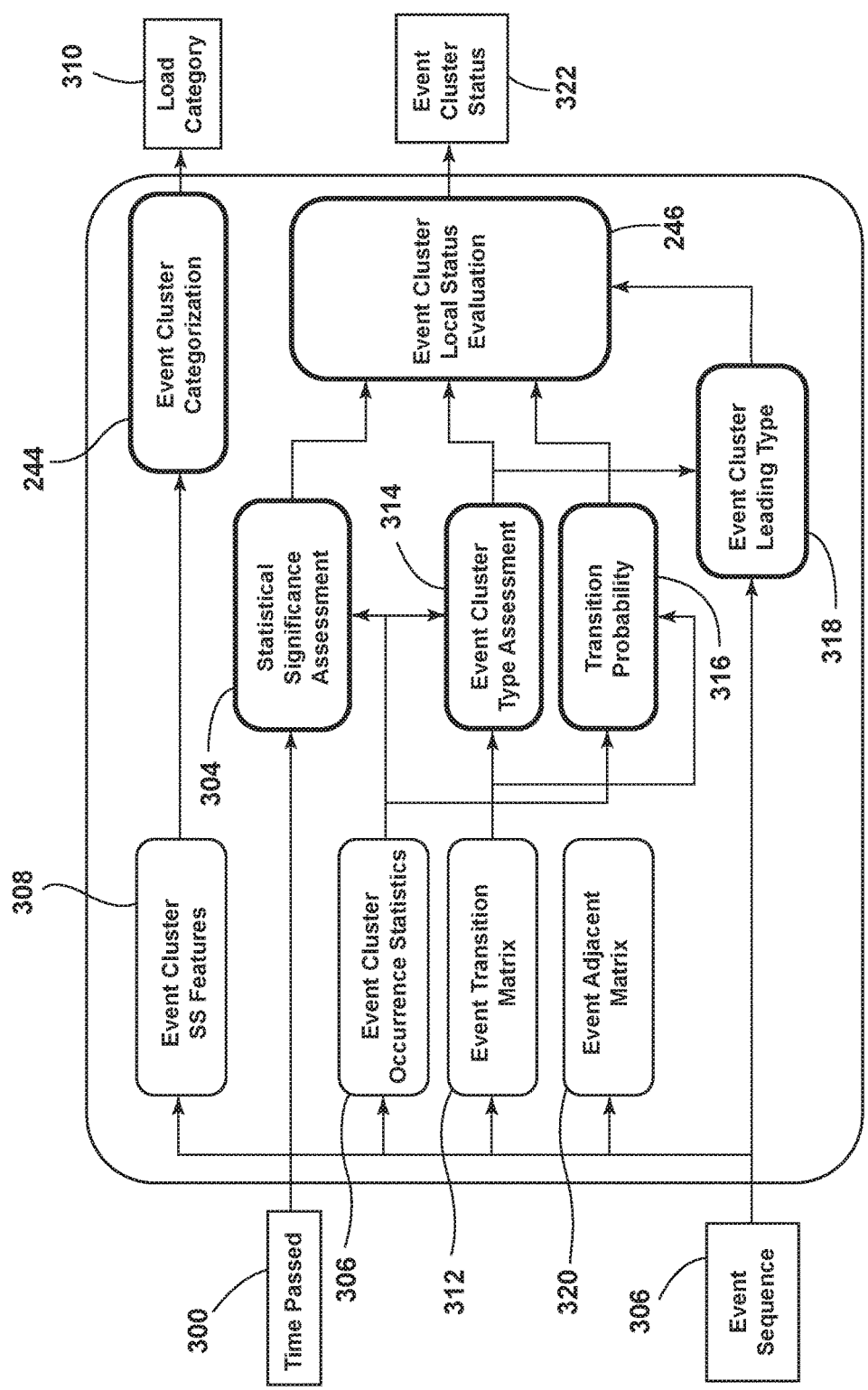
FIG. 9 is a flow diagram generally illustrating event clustering of an embodiment of a method of monitoring an electrical system according to teachings of the present disclosure.

FIG. 9 shows an example of a functional block diagram for an event cluster local status evaluation 246. As generally illustrated, timed passed (block 300) and/or event cluster occurrence statistics (block 302) may be utilized by the ECU 102 for statistical significance assessments (block 304). The ECU 102 may utilize event sequence information (block 306) and/or event cluster steady state features (block 308) for event cluster categorization (block 244), the output of which may be a load category (block 310) for a particular load 106. The ECU 102 may utilize event sequence information (block 306), event cluster occurrence statistics (block 302), and/or an event transition matrix (block 312) for an event cluster type assessment (block 314) and/or for determining transition probabilities (block 316). The ECU 102 may utilize event sequence information (block 306) to determine an event adjacent matrix (block 320). The ECU 102 may utilize event sequence information (block 306) and information from event cluster type assessment (block 314) to determine an event cluster leading type (block 318). The ECU 102 may use information from a statistical significance assessment (block 304), an event cluster type assessment (block 314), one or more determined transition probabilities (block 316), and/or an event cluster leading type (block 318) for an event cluster local status evaluation (block 246). The output of the event cluster local evaluation (block 246) may be an event cluster status (block 322).

Figure 9A:
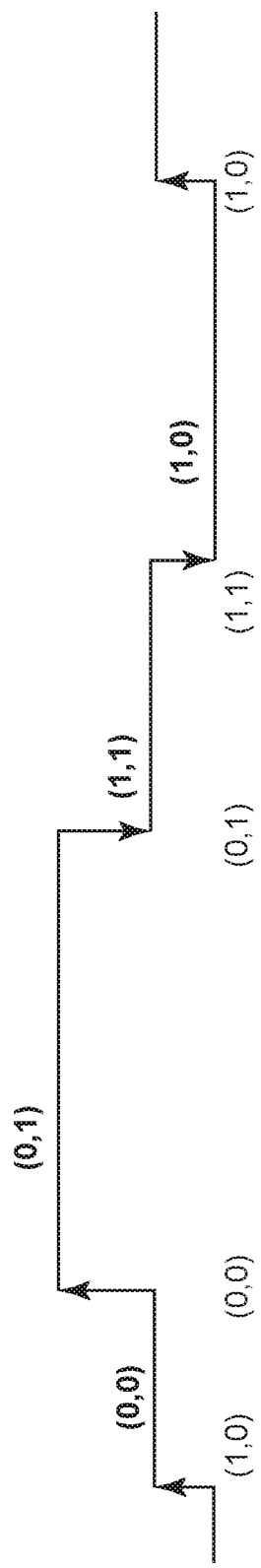
FIG. 9A is an illustration of transition and adjacent matrices of an embodiment of a method of monitoring an electrical system according to teachings of the present disclosure.

With embodiments, for a transition matrix (block 312) and/or an adjacent matrix (block 320), there may be a plurality of transition types. For example and without limitation, a first transition type may include a positive event to a positive event (0,0), a second transition type may include a positive event to a negative event (0,1), a third transition type may include a negative event to a positive event (1,0), and a fourth transition type may include a negative event to a positive event (1,1). The transition matrix (block 312) may include the total occurrences for each transition type. The adjacent matrix (block 320) may include the time delay between two sequential events for each transition type. An example of a series of events with various transition types is generally illustrated in FIG. 9A.

In embodiments, The system 100/method 200 may include a plurality of types (e.g., four types) of event clusters:

Paired Event Cluster: a Positive Event is always followed by a Negative Event, or vice versa;

Positive Event Cluster: a Positive Event is always followed by another Positive Event;

Negative Event Cluster: a Negative Event is always followed by a Negative Event; and/or Paired Sporadic Event Cluster: a Positive Event is always followed by a Negative Event, or vice versa.

The events that belong to the paired sporadic event cluster may not happen often (e.g., not more than one or twice within a week).

In embodiments, the event cluster type (block 314) and the transition probability (block 316) may be evaluated, such as generally shown in Table 5:

TABLE 5

Event Cluster Type and the Transition Probability.

| Event Cluster Type | Membership Function (nTransMXT(i, j)) | | | |
|---|---|---|---|---|
| Transition Probability | Paired | Positive | Negative | Paired Sporadic |
| nTransMXT(0, 0) | <10% | >90% | — | <0.02 |
| nTransMXT(1, 1) | <10% | — | >90% | <0.02 |
| nTransMXT(0, 1) | — | — | — | — |
| nTransMXT(1, 0) | — | — | — | — |
| 2*[nTransMXT(1, 0) − nTransMXT(1, 0)]/ [nTransMXT(1, 0) + nTransMXT(0, 1)] | <0.1 | — | — | <0.02 |
| Combined Probability Logic | AND | — | — | AND |

Where nTransMXT(0,0)=TransMXT(0,0)/Total Events, nTransMXT is the transition occurrences percentage of the total event occurrences within the event cluster, and TransMXT is the transition matrix. For each event cluster type, if the conditions of the column are all satisfied, the ECU 102 may recognize the event cluster as that type. The transition probability may be evaluated based on membership functions with nTransMXT elements as inputs. The combined probability may be evaluated based on Bayesian rules and/or corresponding methods. The event cluster type may be recognized (e.g., confirmed) if the combined probability is larger than a threshold (e.g., 90%).

With embodiments, an example of a statistical significance assessment may be conducted, at least in part, as shown in Table 6.

TABLE 6

Statistical Significance.

| Total Occurrences | Time | Statistical Significance | Case # |
|---|---|---|---|
| >=200 | — | YES | 1 |
| <200 | >=1 Week | YES for Sporadic | 2 |
| <200 | <1 Week | NO | 3 |

If there are enough event occurrences (e.g., 200 or more) and a long enough time has passed (e.g., at least one week), the statistical significance may be considered as being established for first stage learning 204. Otherwise, the event cluster status may be set to "Pending".

If statistical significance is satisfied, but the combined probability is less than a threshold (e.g., 50%), the event cluster status may be set to be "Abandoned". Such event clusters may be removed from the active cluster indices by the ECU 102 through event cluster rearrangement handling.

With embodiments, the method may include event cluster rearrangement (block 330) that may be implemented by the ECU 102. Event cluster rearrangement 330 may be used to update event clusters when a new event cluster is generated and/or when an event cluster status becomes "Abandoned". For example, for "Abandoned" event clusters, this function may provide an error handling capability, which may include removing "Abandoned" event clusters to prevent unnecessary maintenance for an event cluster that is no longer valid. With event clustering 204 and event cluster rearrangement 330, the system 100/method 200 may only maintain valid event clusters with strong enough statistical significance to support the later steps for event cluster association 210 and load cluster generation 262.

Figure 11:
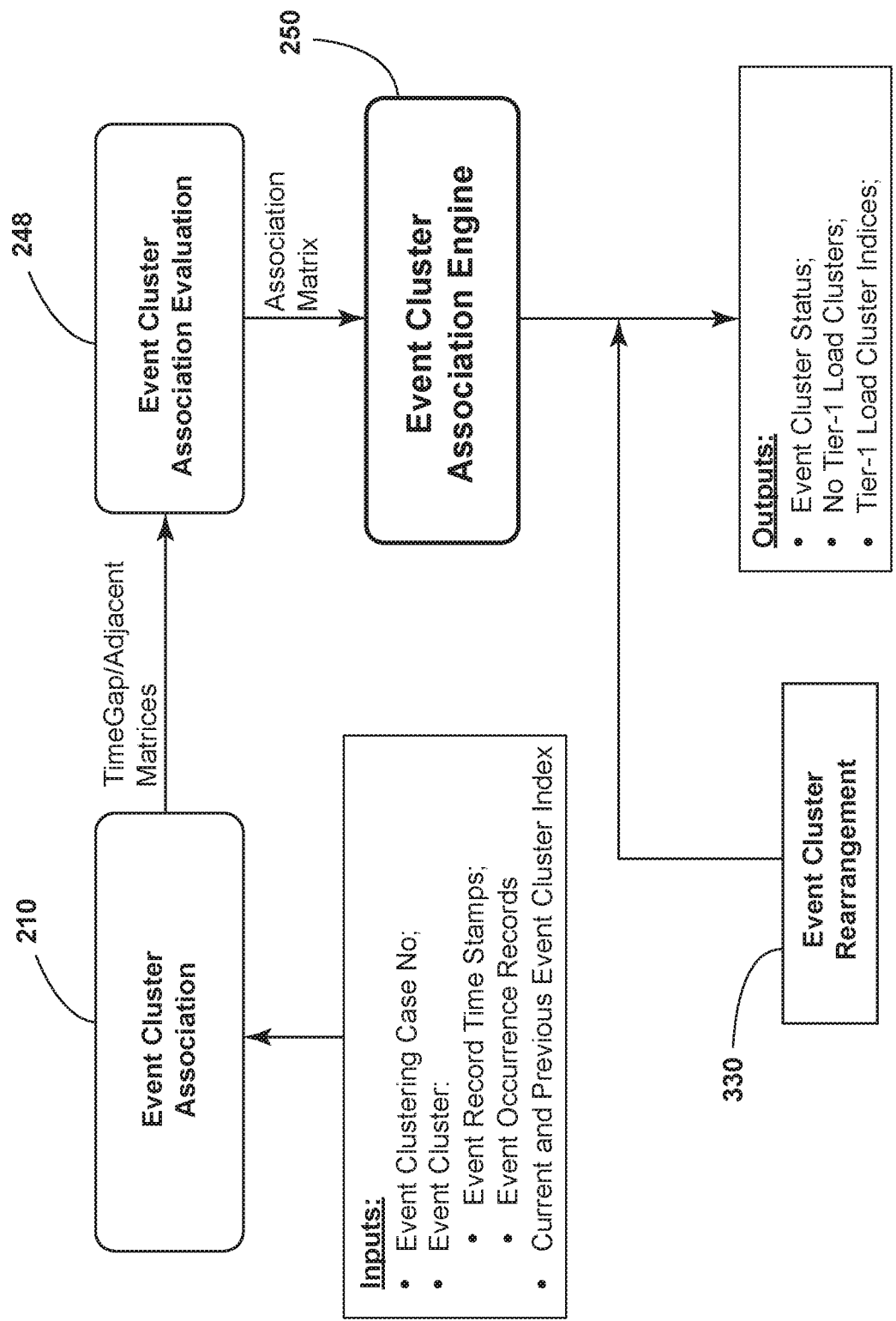
FIG. 11 is a flow diagram generally illustrating event clustering of an embodiment of a method of monitoring an electrical system according to teachings of the present disclosure.

In embodiments, such as generally illustrated in FIG. 11, the method 200 may include event cluster association 204 that may be implemented by the ECU 102. Event cluster association 204 may associate some or all related event clusters by loads 106. There may be a plurality of types of loads 106 (e.g., two types), such as single power stage and multiple power stage. The single power stage loads 106 may include a constant ON power profile, and may trigger a pair of Positive and Negative events during a use cycle. Single power stage appliances may include, for example and without limitation, lighting, water heaters, monitors, and/or refrigerators, among others. This type of load may involve only one "Paired" type event cluster. Multiple power stage appliances may include different components. During a use cycle, an load of this type may trigger multiple events in a deterministic sequence (e.g., a furnace with an induction blower, next an igniter, and finally a main blower). This type of load may involve multiple event clusters. Association of these event clusters may facilitate handling of loads with multiple power stages for load disaggregation.

Figure 10:
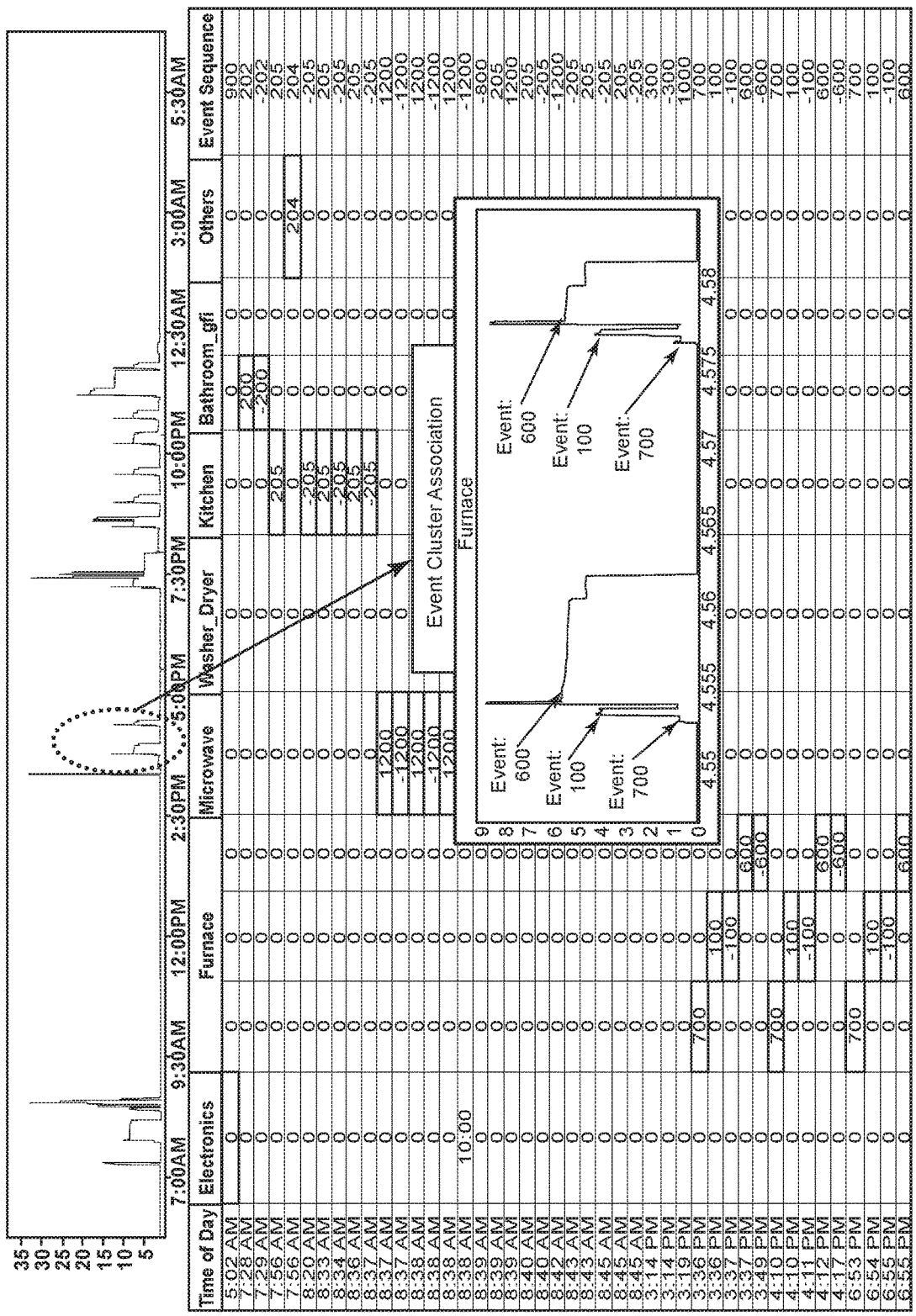
FIG. 10 is a graphical view generally illustrating power consumption of electrical loads and event clustering associated therewith for an embodiment of an electrical system according to teachings of the present disclosure.
Figure 10:
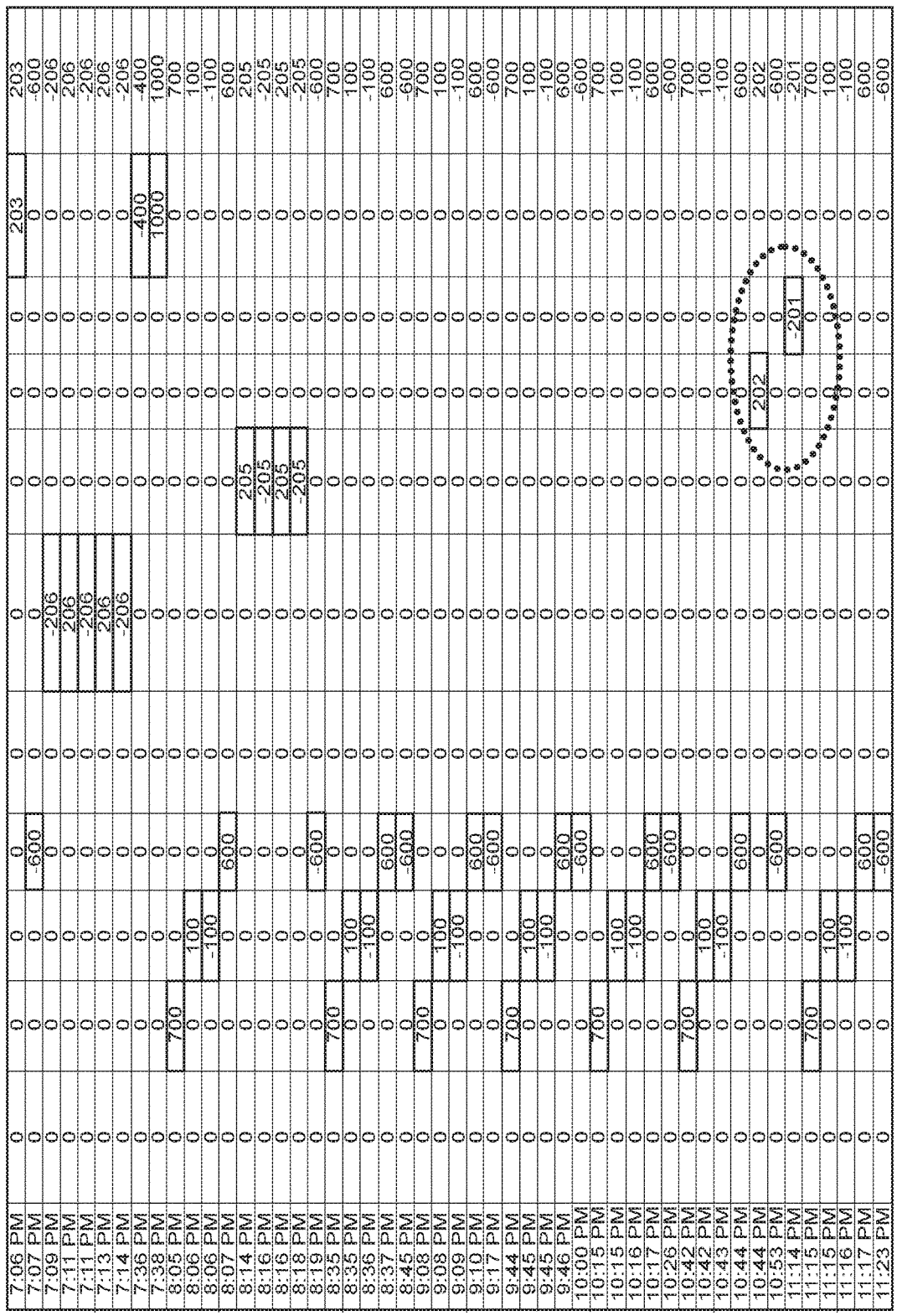

With respect to the one-day snapshot of current RMS profile (also shown in FIG. 3), FIG. 10 generally illustrates three event clusters involved within one use cycle of a sample load (e.g., a furnace). The event sequence for these three event clusters follows a pattern, e.g., (700) to (100) to (−100) to (600) to (−600). To decompose the power profile for a load of this type, the event cluster association 204 and the corresponding event sequence pattern may be established and/or stored by the ECU 102. The objectives for event cluster association tasks may include:

Detecting some or all associated event clusters by loads 106;

Updating the status of the event clusters after association; and/or

Generating and maintaining the resultant Tier-1 load clusters.

With embodiments, such as generally illustrated in FIG. 11, event cluster evaluation may involve a plurality of components, such as (i) event cluster association 210, (ii) event cluster association evaluation 248, and/or (iii) event cluster association engine 250.

With embodiments, the ECU 102 may utilize event cluster association 210 and/or event cluster association evaluation 248 to (a) calculate and update an adjacent matrix (AdjMXT) and a time gap matrix (TimeGapMXT), and/or (b) calculate an association matrix (AssociationMXT). The ECU 102 may utilize the AdjMXT and TimeGapMXT matrices to assess the adjacent relations between some or all pairs of event clusters being maintained. For example, if there are 30 event clusters being maintained in the system 100, the dimension of the two matrices may be 30×30. Element AdjMXT(i,j) may represent the probability of an event_cluster_i event being followed by an event_cluster_j event. TimeGapMXT(i,j) may represent the time duration of an event cluster_i event followed by an event cluster_j event. The ECU 102 may assess adjacent relations without relying on the status of event clusters, which may allow the ECU 102 to assess adjacent relations from the beginning of an event cluster creation.

In embodiments, associationMXT(i, j) may represent the association level between a first event cluster (e.g., event_cluster_i) and a second event cluster (e.g., event_cluster_j). Event cluster association evaluation 248 may be executed when there are at least two "Confirmed" event clusters. Otherwise, an association matrix (e.g., AssociationMXT) may be set with default values. Only the elements related to "Confirmed" event clusters may be valid. For all of the event clusters that are Pending and Abandoned, the related elements may not be considered.

With embodiments, the system 100 (e.g., the ECU 102) may include an event cluster association engine 250 that may be configured to retrieve the indices of some or all of the associated event clusters to create Tier-1 load clusters and not Tier-1 load cluster, such as based on the association matrix. The event cluster association engine 250 may be executed, for example, only when there are at least two "Confirmed" event clusters. The event cluster association engine 250 may, for every active event cluster, locate the other event cluster with the maximum association value from the association matrix. Depending on the maximum association value (e.g., compared to max association thresholds) and the event cluster type, the event cluster association engine 250 may then determine whether these two event clusters should be associated together. An example flow for the event cluster association engine 250 is summarized in Table 7.

TABLE 7

Event Cluster Association Mode Evaluation and Conditions.
Event Associate Engine Modes

| Inputs | | | Outputs | | | |
|---|---|---|---|---|---|---|
| Previous Event Cluster Status | Event Cluster Type | Max. Association Threshold | New Event Cluster Status | Tier-1 Load Cluster | Tier-1 Load Clusters | Engine Modes |
| Confirmed | Baseline | <3e−4 | Independent | ** | Add Event Index | Independent |
| | | >3e−4 | Confirmed (unchanged) | Unchanged | Unchanged | Null case mode |

TABLE 7-continued

Event Cluster Association Mode Evaluation and Conditions.
Event Associate Engine Modes

| Inputs | | | Outputs | | | |
|---|---|---|---|---|---|---|
| Previous Event Cluster Status | Event Cluster Type | Max. Association Threshold | New Event Cluster Status | Tier-1 Load Cluster | Tier-1 Load Clusters | Engine Modes |
| | Sporadic | <3e−4 | Independent | ** | Add Event Index | Independent |
| | | >3e−4 | Confirmed (unchanged) | Unchanged | Unchanged | Null case mode |
| | Paired | <3e−4 | Independent | ** | Add Event Index | Independent |
| | | >0.9 | Associated | Enable Association Searching | Enable Association Searching | Association Searching |
| | | (3e−4, 0.9) | Confirmed (unchanged) | Unchanged | Unchanged | Null case mode |
| | Positive | >0.9 | Associated | Enable Association Searching | Enable Association Searching | Association Searching |
| | | <0.9 | Confirmed (unchanged) | Unchanged | Unchanged | Null case mode |
| | Negative | — | Confirmed (unchanged) | Unchanged | Unchanged | Null case mode |
| Associated/ Independent | — | — | Associated/ Independent (unchanged) | Unchanged | Unchanged | Null case mode |
| Pending/ Abandoned | — | — | Pending/ Abandoned (unchanged) | Unchanged | Unchanged | Null case mode |

With embodiments, an event cluster association engine 250 may include a plurality of modes (e.g., three modes), such as a null case mode, an independent mode, and/or an association search mode (ASM). In the null case mode, the event cluster may remain unchanged. In the independent mode, a confirmed paired event cluster may be registered as a Tier-1 load cluster. In the ASM, the engine 250 may search for/find all associated event clusters that belong to one Tier-1 Load Cluster. There may be at least two possible scenarios for association searching. For example and without limitation, with a first scenario (SC-1), confirmed event clusters may be associated together, and/or, with a second scenario (SC-2), associated event clusters may be associated together. SC-2 may not be changed to SC-1, but SC-1 may be changed to SC-2. Once SC-2 happens, it may always lead to "End Association".

Tables 8 and 9 below summarize example flows for SC-1 and SC-2 respectively.

TABLE 8

ASM - SC-1 Flow.
First Scenario (SC-1): Event Status of sequentially associated Event Cluster = Confirmed

| Inputs | | | Event | | Outputs | | |
|---|---|---|---|---|---|---|---|
| Prev. State | Cond. of State | Max. Assoc. | Cluster Status | Temp. Indep. Sequence | Next Event Cluster Index | No Tier-1 Load Clusters | Tier-1 Load Clusters |
| First Assoc. | Iteration = 1 | — | Associated | Initialize with Event Cluster Index from Active Cluster Indices; attach sequential next Event Cluster Index | Sequen. associated Event Cluster Index | No change | No change |
| Sequen. Assoc. | Iteration != 1 | >0.7 | Associated | Attach sequential next Event Cluster | Sequent, associated Event Cluster Index | No change | No change |

TABLE 8-continued

ASM - SC-1 Flow.
First Scenario (SC-1): Event Status of sequentially associated Event Cluster = Confirmed

| Inputs | | | | Outputs | | | |
|---|---|---|---|---|---|---|---|
| Prev. State | Cond. of State | Max. Assoc. | Event Cluster Status | Temp. Indep. Sequence | Next Event Cluster Index | No Tier-1 Load Clusters | Tier-1 Load Clusters |
| End Assoc. | Iteration ! = 1 | <0.7 | Confirmed (unchanged) | Reset to 0 | Unchanged (or set to 0) | ** | Attach final temp. Indep. Sequence to array indexed by No Determined Load Clusters |

TABLE 9

ASM - SC-2 Flow.
Second Scenario (SC-2): Event status of sequentially associate event cluster = associated

| Inputs | | | | Outputs | | | |
|---|---|---|---|---|---|---|---|
| Prev. State | Cond. of State | Max. Assoc. | Event Cluster Status | Temp. Indep. Sequence | Next Event Cluster Index | No Tier-1 Load Clusters | Tier-1 Load Clusters |
| First Assoc. | Iteration = 1 | — | Unchanged | Initialize with Event Cluster Index from Active Cluster Indices; attach associated sequence array | The last event cluster index in the associated sequence array | No change | No change |
| Sequen. Assoc. | Iteration ! = 1 | >0.7 | Unchanged | Attach associated sequence array | The last event cluster index in the associated sequence array | No change | No change |
| End Assoc. | Iteration ! = 1 | — | Confirmed/ associated (unchanged) | Reset to 0 | No change (or set to 0) | No change | Attach final temp. indep. Sequence to array indexed by associated sequence array index |

In embodiments, event cluster association 204 may result in Tier-1 load clusters, which may facilitate load disaggregation 264 at the granular level of individual loads 106 (e.g., devices/appliances). The longer the system 100/method 200 operates (or the longer the learning processes are), the more Tier-1 load clusters there may be.

With embodiments, inputs for event cluster association 210 may include event clustering case number, event record time stamps, event occurrence records, and/or current and previous event cluster indices. Outputs of event cluster evaluation may include, for example, event cluster status, non-Tier-1 load clusters, and/or Tier-1 load cluster indices.

Figure 12:
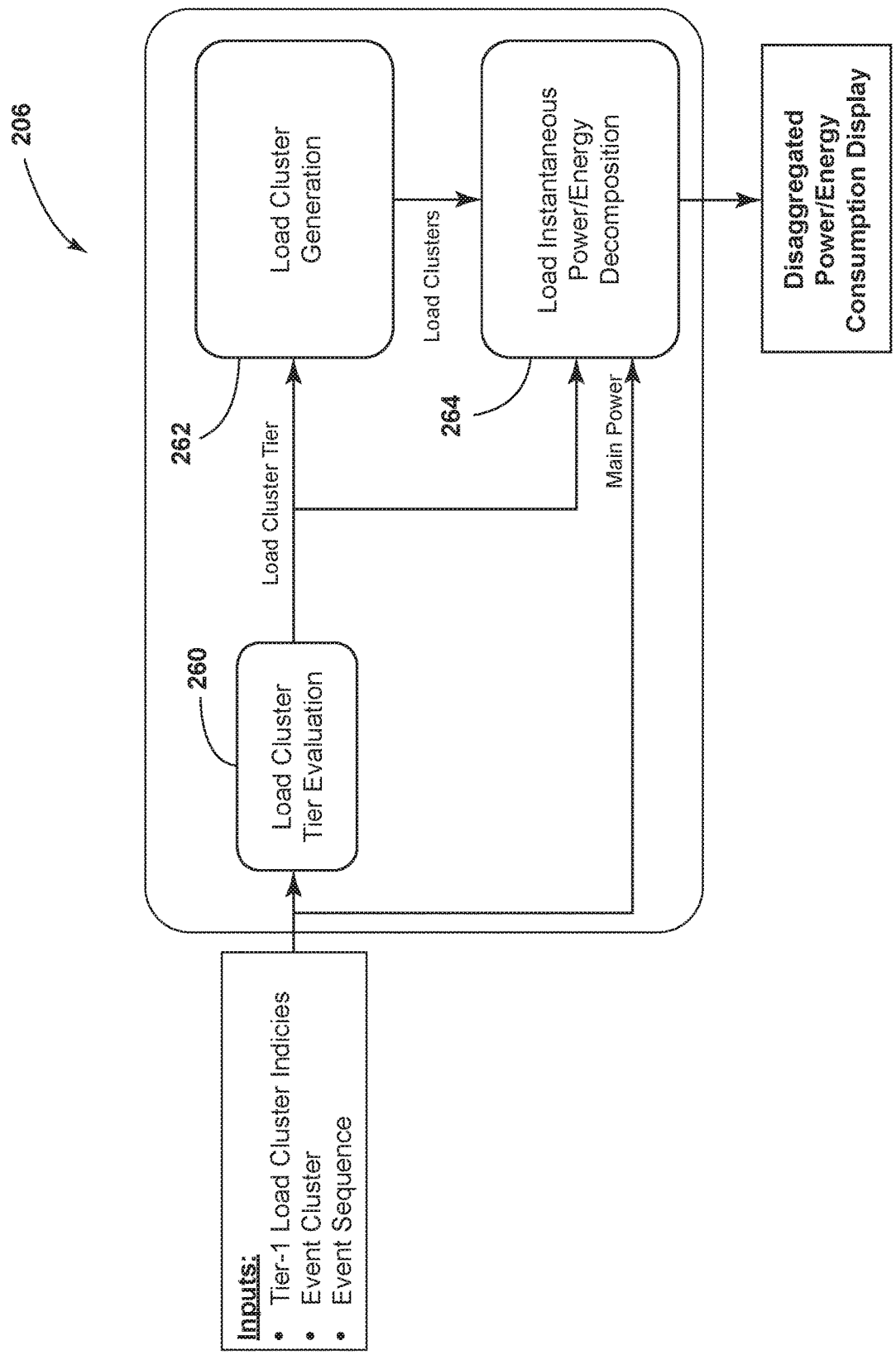
FIG. 12 is a flow diagram generally illustrating appliance cluster generation and power disaggregation of an embodiment of a method of monitoring an electrical system according to teachings of the present disclosure.

In embodiments, such as generally illustrated in FIG. 12, the method 200 may include and/or the system 100 may be configured for load cluster generation 262 and power disaggregation/decomposition 264 that may be configured to generate and maintain the tiers of load clusters based on the latest status of some or all available event clusters, such as generally illustrated in Table 10.

TABLE 10

Load Cluster Tiers.

| Tier | Description | Learning Stage |
|---|---|---|
| Tier-1 | "Associated" event clusters into one load cluster; Defined event cluster sequence within this load cluster; | Post learning Stage-2 |

TABLE 10-continued

Load Cluster Tiers.

| Tier | Description | Learning Stage |
|---|---|---|
| | The number of Tier-1 load clusters may depend on the actual number of loads in the system (e.g., the home or aircraft), and/or the number of loads that have been learned. | |
| Tier-2 | "Confirmed" event cluster + "Paired" or "Sporadic" event cluster type | During learning Stage-2 |
| | Defined event sequence within one event cluster; There may be a plurality of three Tier-2 load clusters (e.g., R-; X-; and E-) | |
| Tier-3 | "Pending"/"Confirmed" event cluster + "Positive"/ "Negative" event cluster type; no defined event sequence within this Tier-3 load cluster; there may be only one Tier-3 load cluster | During learning Stage-1 | confirmed—the power profile of this event may then be recorded and tracked in a Tier-2 load cluster; and/or (b) a leading event that triggers the event cluster status to change from confirmed to associated—the power profile of this event may be recorded and tracked in a Tier-1 load cluster.

In embodiments, such as generally illustrated in FIG. 12, load cluster generation and power disaggregation 206 may include load cluster tier evaluation 260, load cluster generation 262, and/or load instantaneous power/energy disaggregation/decomposition 264. Inputs may include Tier-1 load cluster indices, event cluster information, and/or event sequence information. An output may include disaggregated power/energy consumption information.

With embodiments, load cluster tier evaluation 260 may be utilized to determine a load cluster tier and/or a load cluster index for newly detected events. This information may facilitate determining how the event should be handled for load cluster generation and instantaneous power disaggregation 206. Table 11 summarizes example conditions for tier evaluation.

TABLE 11

Load Cluster Tier Evaluation Conditions

| Event Clustering Case # | Inputs | | | | Outputs Load Tier |
|---|---|---|---|---|---|
| | Event Duration | Event Cluster Type | Event Cluster Status | Event Sequence Type | |
| 0 | — | — | — | — | 3 |
| 1 | — | — | — | — | 3 |
| 2 | 1 | — | — | — | Unchanged (3) |
| 3/5 | — | — | Pending | — | 3 |
| 5 | — | Positive/ Negative | Confirmed | — | 3 |
| 5 | — | Paired/ Sporadic | Confirmed | — | 3 |
| 5 | — | Paired/ Sporadic | Confirmed | With no sequence consistency | 2 |
| 5 | — | — | Associated | — | 3 |
| 5 | — | — | Associated | With no sequence consistency | 1 |
| 6 | 1 | — | Associated | — | Unchanged (1) |

In embodiments, load cluster generation 262 and power disaggregation/decomposition 264 may maintain the disaggregated/decomposed instantaneous power/energy consumption by the three tiers of load clusters depending on the learning stages (or status) of the event clusters.

If an event is a first event (e.g., a baseline event), the power profile of this event may be recorded and tracked in the Tier-3 load cluster. For the event clusters in the first stage of learning 204 (e.g., pending event clusters), the power profiles of some or all related events may be recorded and tracked in the Tier-3 load cluster. For event clusters in the second stage of learning 210 (e.g., confirmed event clusters), the power profiles of some or all related events may be recorded and tracked in a Tier-2 load cluster. For event clusters beyond the second stage of learning (e.g., associated event clusters), the power profiles of some or all related events may be recorded and tracked in a Tier-1 load cluster.

Figure 13:
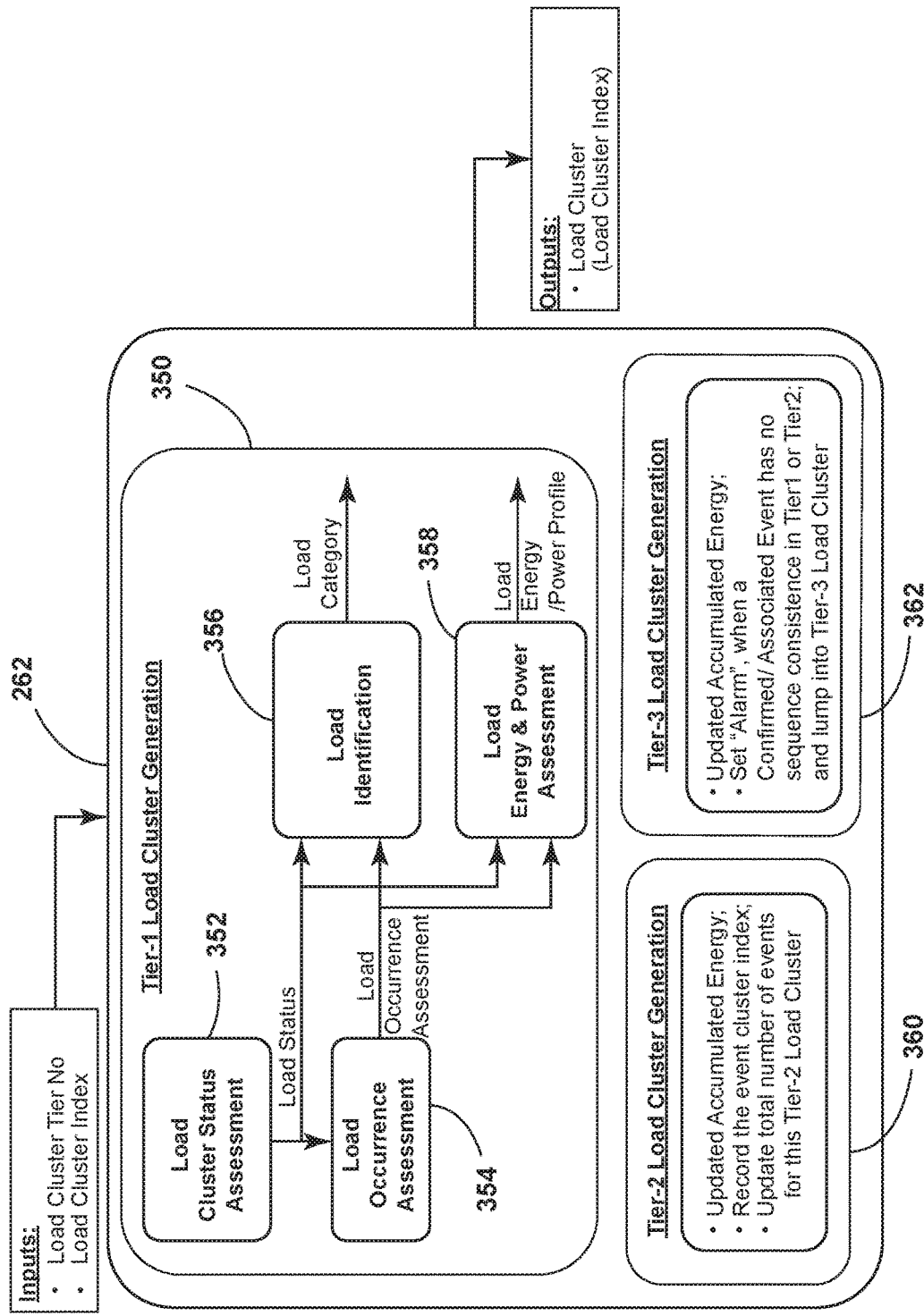
FIG. 13 is a flow diagram generally illustrating appliance cluster generation of an embodiment of a method of monitoring an electrical system according to teachings of the present disclosure.

With embodiments, during an event cluster status transition, the flow may include (a) a leading event that may trigger the event cluster status to change from pending to With embodiments, the method 200 may include applying load cluster generation and/or updating 262, which may be configured to provide a continuous statistical assessment and updates for some or all generated load clusters in the three tiers. FIG. 13 generally illustrates a system block diagram and use cases for Tier-1/2/3 load cluster generation.

In embodiments, load cluster generation 262 for Tier-1 loads (block 350) may include a load cluster status assessment 352, a load occurrence assessment 354, a load identification 356, and/or a load energy and power assessment 358. A load clusters status assessment 352 may determine a load cluster type (e.g., paired, composed, etc.) and/or a load cluster status. A load occurrence assessment 354 may determine assess a total number of occurrences and/or an occurrence frequency. Load identification 356 may include identifying the load down to the device-level. A load energy and power assessment 358 may determine an on power profile sequence and/or on energy for the load 106.

With embodiments, Tier-2 load cluster generation 360 may include updated accumulated energy, recoding an event cluster index, and/or updating a total number of events for the Tier-2 load cluster. In embodiments, Tier-3 load cluster generation 362 may include updating accumulated energy, setting an alarm when a confirmed/associated event has not sequence consistency in Tier-1 or Tier-2, and moving such an even into the Tier-3 load cluster. Inputs of load cluster generation 262 may include a load cluster tier number and/or a load cluster index. Outputs of load cluster generation 262 may include load clusters, load cluster indices, load categories (e.g., for Tier-1 load clusters), and/or a load energy/power profile (e.g., for Tier-1 load clusters).

In embodiments, the method 200 may include evaluating the following information, such as within one load cluster, and for each associated event cluster array:

(a) An "on" power profile sequence [8, 2], which may include (i) Baseline/Paired/Sporadic: Power[1]; Duration [1], and/or (ii) Composed: Power[N]; Duration[N], N=length of the associated event sequence;

(b) ON Energy, which may include the total energy consumed when the load is on (in use); and/or (c) Load activity status, which may indicate whether a load is on or not.

In embodiments, the system 100 (e.g., the ECU 102) may utilize an on power profile sequence and an on energy with statistical significance to assess the healthiness of the load cluster and/or for accumulated energy/instantaneous disaggregated power profiles.

With embodiments, the method 200 may include and/or the system 100 may be configured for instantaneous power disaggregation by load cluster that may be utilized to provide instantaneous power disaggregation for some or all load clusters generated. If a new event is detected, the event and its power may be used to update the instantaneous power for the load cluster to which the event belongs.

Figure 14:
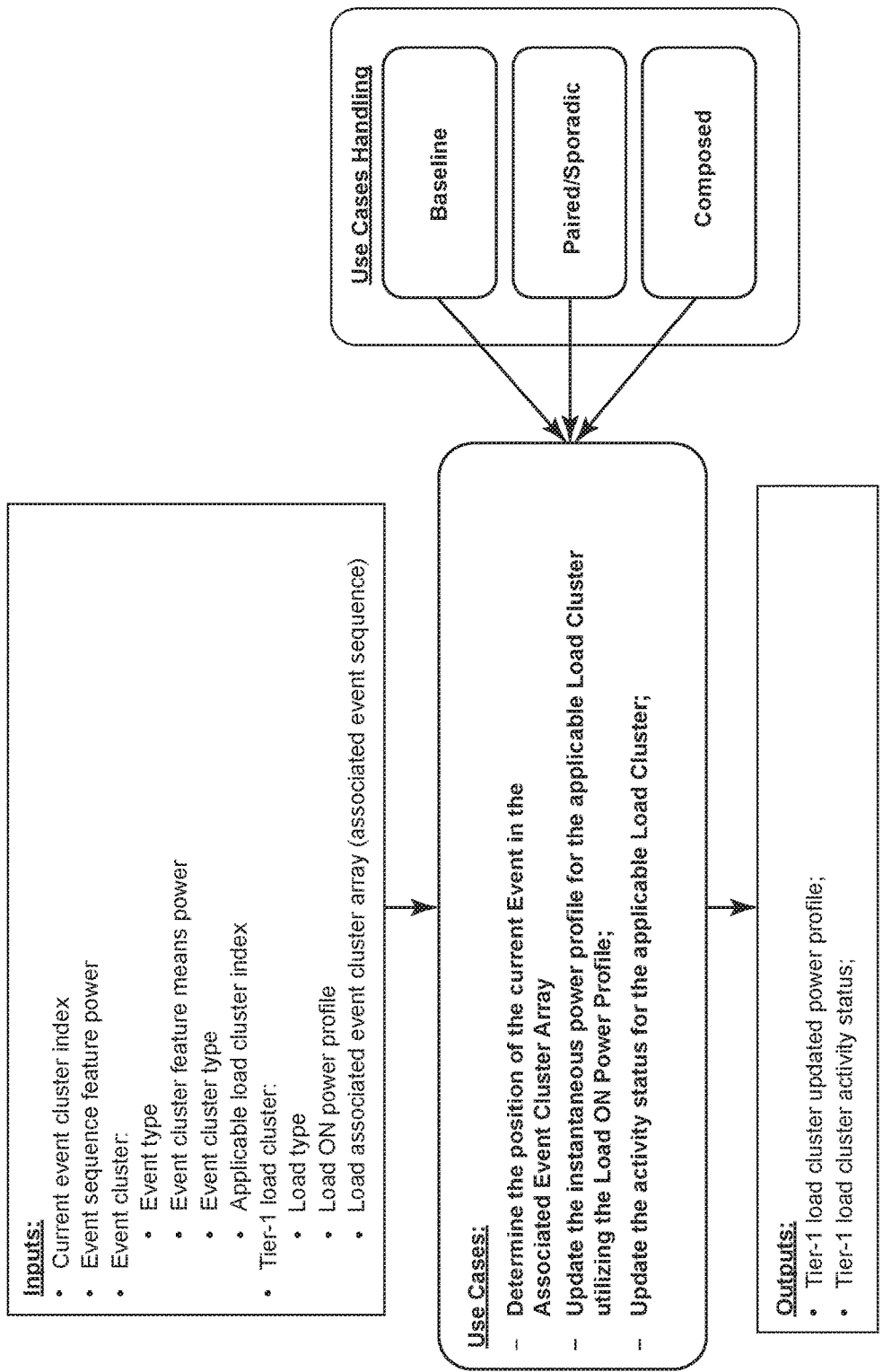
FIG. 14 is a flow diagram generally illustrating power disaggregation of an embodiment of a method of monitoring an electrical system according to teachings of the present disclosure.
Figure 15:
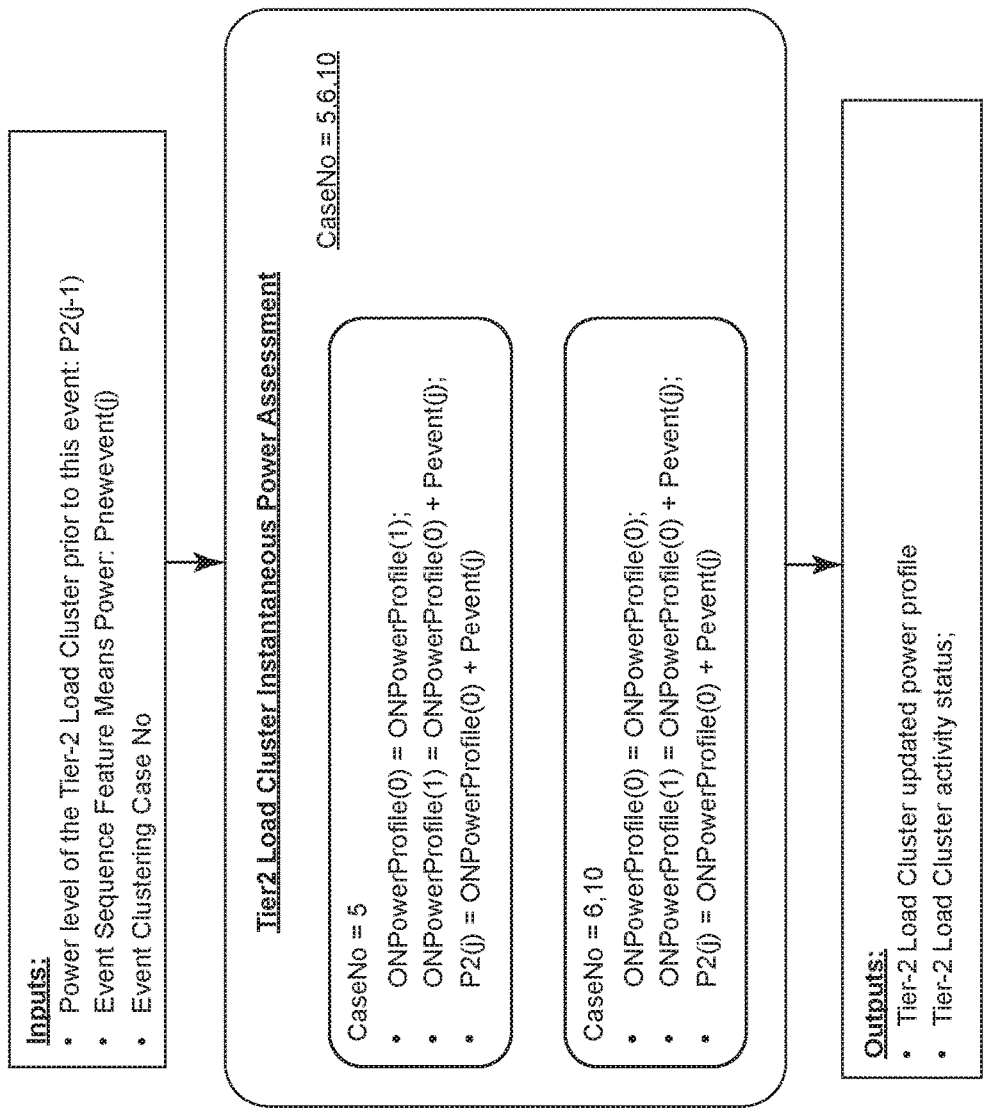
FIG. 15 is a flow diagram generally illustrating power disaggregation of an embodiment of a method of monitoring an electrical system according to teachings of the present disclosure.
Figure 16:
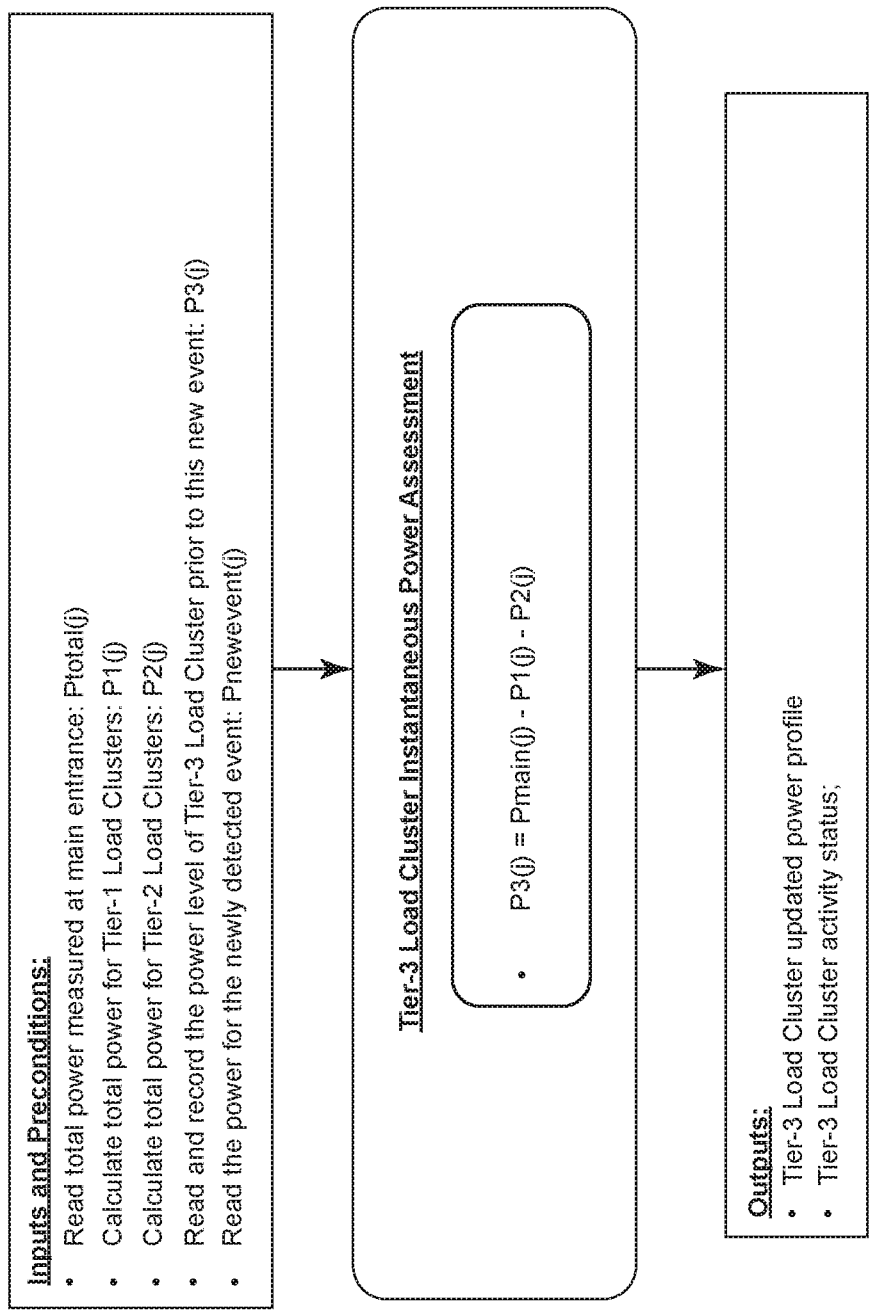
FIG. 16 is a flow diagram generally illustrating power disaggregation of an embodiment of a method of monitoring an electrical system according to teachings of the present disclosure.

With embodiments, as generally illustrated in FIGS. 14-16, some or all of the tiers of load clusters may be handled differently. For example and without limitation, the method 200 of monitoring may include, for a Tier-1 load cluster, obtaining a current event cluster index, an event sequence feature power, event cluster information, and/or load cluster information (see, e.g., FIG. 14). The event cluster information may include one or more of an event type, an event cluster feature mean power, event cluster status, and/or a load cluster index. The load cluster information may include one or more of a load type, a load on power profile, and/or an associated event cluster array (e.g., associated event sequence). The ECU 102 may utilize some or all such information to determine a Tier-1 load cluster updated power profile and/or a Tier-1 cluster activity status.

In embodiments, such as generally illustrated in FIG. 15, for Tier-2 load clusters, the ECU 102 may utilize one or more of a power level of the prior Tier-2 load cluster P2(j−1), the mean power of the event sequence feature, and/or an event clustering case number in determining a Tier-2 load cluster updated power profile, and/or a Tier-2 load cluster activity status.

With embodiments, such as generally illustrated in FIG. 16, with Tier-3 loads, the ECU 102 may utilize one or more of total power measured at the power source (Ptotal(j)), a total power of Tier-1 load clusters (P1(j)), a total power of Tier-2 load clusters (P2(j)), a power level of Tier-3 load clusters before the current event (P3(j)), and/or a power for the current event (Pnewevent(j)), in determining a Tier-3 load cluster updated power profile, and/or a Tier-3 load cluster activity.

In embodiments, as shown in Table 12, there may be three scenarios when updating an instantaneous power profile.

TABLE 12

Scenarios for Updating an Instantaneous Power Profile

Figure 17:
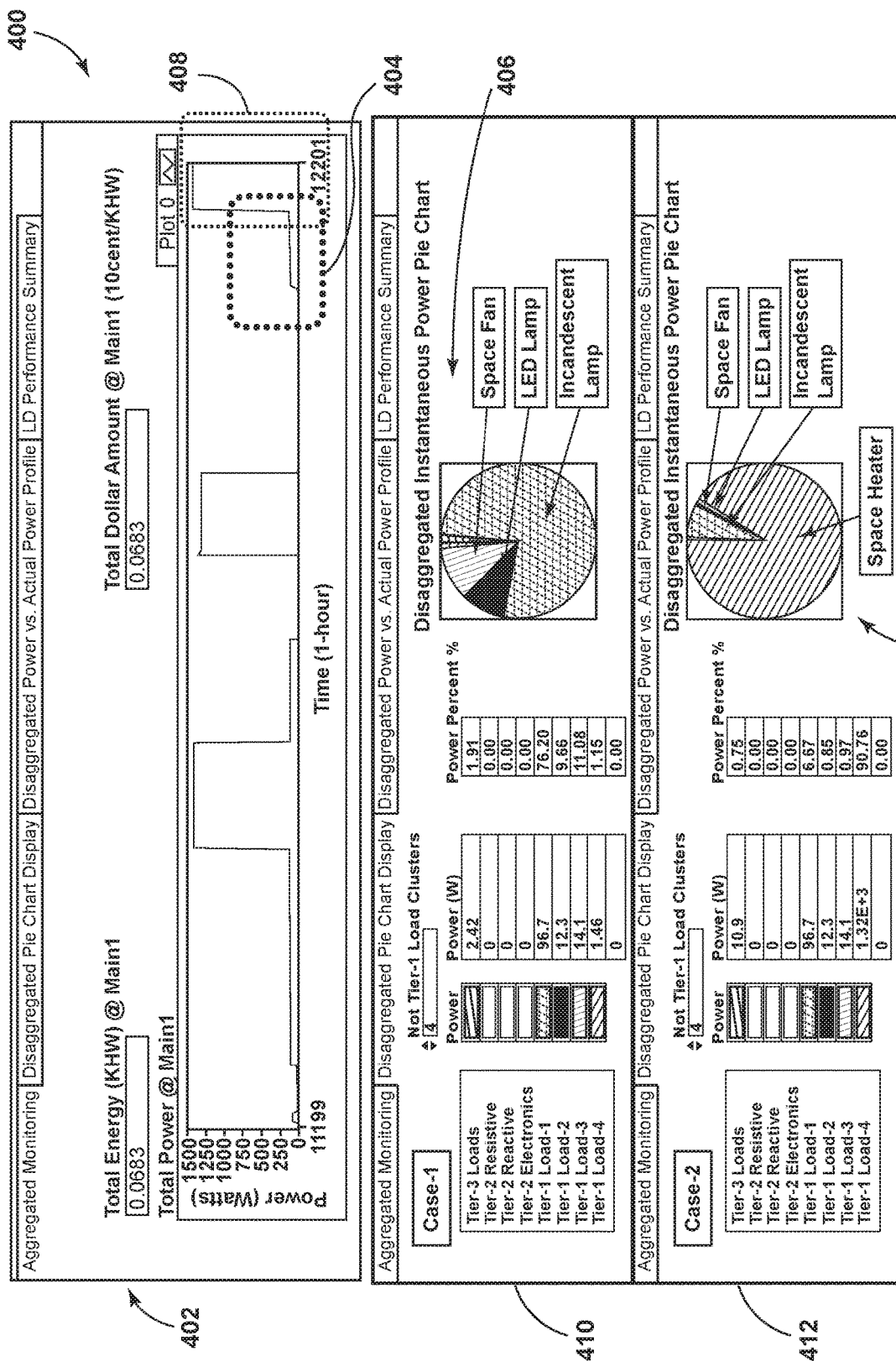
FIG. 17 is graphical representation generally illustrating power disaggregation of an embodiment of a method of monitoring an electrical system according to teachings of the present disclosure.

If the load type is paired or sporadic:
    If the event type is positive:
        Updated on power profile = ONPowerProfile(1) + Pevent(j)
        Activity status = 1;
    If the event type is negative:
        Updated on power profile = ONPowerProfile(0) − Pevent(j);
        Activity Status = 0;
If the load type is composed:
    If the event type is positive:
        If event is the first event:
            Updated on power profile = ONPowerProfile(LastEventPosition)
            + Pevent(j)
        If Not First Event
            Updated on power profile =
            ONPowerProfile(PreviousEventPosition) + Pevent(j)
        Activity = 1;
    If the event type is negative:
        If the event cluster type is paired or sporadic:
            Updated on power profile =
            ONPowerProfile(CurrentEventPosition) − Pevent(j)
        Else
            Updated on power profile =
            ONPowerProfile(PreviousEventPosition) − Pevent(j)
        If the event is the last event, Activity = 0;
        Otherwise, if the event is not the last event, Activity = 1 [unchanged];
If the type of the previous event cluster in the associated event cluster index array is
paired (handling for the negative edge of the paired event)
        Updated on power profile = ONPowerProfile(CurrentEventPosition) −
        EventSequence(previous).Power With embodiments, such as generally illustrated in FIG. 17, the ECU 102 may be configured to display power information for one or more loads 106, such as in the form of a dashboard 400. The example dashboard 400 shows the instantaneous power disaggregation performance for an example case. The upper portion 402 of the dashboard 400 shows the aggregated power measured at the power source 104 (e.g., via the sensor 108). During a first period 404, there are three loads in use downstream, (e.g., a space fan (14.1 W), an LED lamp (12.3 W), and an incandescent lamp (96.7 W)). The ECU 102 may generate disaggregated instantaneous power information and display the information, such as in a pie chart 406 (or other graphic) that demonstrates that the measured main power is decomposed by the power consumptions of these three loads, an example of which is generally illustrated in the second portion 408 of the dashboard. During a second period 410, another load (e.g., a 1320 W space heater), is turned on. The ECU 102 may update disaggregated instantaneous power information (and the power pie chart 406) to indicate that the main power is decomposed by the power consumptions of the four loads in use, such as generally illustrated in the third portion 412 of the dashboard 400. The decomposed power consumptions match to the actual consumption values of these loads 106.

In embodiments, there may be assumptions that help establish or select applicable boundaries/thresholds. These assumptions may result from the statistical distribution of the loads 106. If two loads overlap with the features/signatures selected, any selected thresholds may result in failure cases in some instances. Compensating for these potential failure cases may improve the efficiency of embodiments of the system 100/method 200. Embodiments of the system 100/method 200 may be configured to handle failures to prevent the cascading of errors.

With embodiments, assumptions of the system 100/method 200 may fall into two categories (i) SS features that may be used to establish sensitivity for state detection and/or sensitivity for event clustering; and/or (ii) various time delays that may be used to reflect typical time constants of various appliances during start up, typical ON durations of a load in use, and/or typical time gaps between adjacent ON/OFF events from different loads.

In embodiments, potential failures may fall into two categories (i) method-driven, and/or (ii) actual use scenario driven. The method-driven failures may include failures in feature selection, boundary/threshold selection, and/or distance evaluation. With method-driven types of failures, recovery may not be handled easily. However, the SS feature selection can help define the sensitivity of one or more potential aspects of embodiments of the method 200 (e.g., sensitivity to pick up an event with masking baseline features). Actual use scenario driven failures may include failures resulting from the actual use scenarios not matching some predetermined assumptions, such as, for example and without limitation, two or more different events do not happen within a duration less than 1 minute, and/or an event happens with a large baseline feature masking, which falls out of the sensitivity level.

Table 13 provides examples of potential failure cases, consequences, and responses for at least some embodiments of the system 100/method 200.

TABLE 13

Fault Analysis and Response

| Function | Causes | Faulty Consequences | Response |
| --- | --- | --- | --- |
| State Detection | Steady state features selection and sensitivity | Unnecessary states Missing states | Noise suppression Multidimensional features with nonlinear threshold |
| Event Detection | Two or more sequential state changes happen with event delay | Detected events with characteristics of combined multiple events Paired/associated events need to be handled | Abandoned Event Cluster Assign Event to Tier-3 as short-term error Sequence Consistency Evaluation |
| Event Clustering | Steady state features selection and sensitivity Distance Evaluation unstable | Misclassification of Event Clusters | Multidimensional features with nonlinear threshold Longer Distance Evaluation time delay |
|  | Two or more sequential state changes during event duration buffer | Detected events with characteristics of combined multiple events Paired/associated events need to be handled | Abandoned Event Cluster Assign Event to Tier-3 as short-term error Sequence Consistency Evaluation |

With embodiments, the system 100/method 200 may be used in connection with one or more of a variety of applications, such as a residential building/home (e.g., single phase 60 Hz electrical circuits) and/or aircraft applications (e.g., multiphase, variable frequencies circuits, AC and DC circuits). The system 100/method 200 may be particularly useful with aircraft applications as it may be especially important with such applications to monitor critical components, to minimize down-time of aircraft, and/or limit extra components.

In embodiments, the system 100/method 200 may include load identification and disaggregation, which may allow for (or include) decomposing the voltage and current signals for each individual load 106 that is routed through a central location, such as a power source 104 (e.g., an aircraft circuit breaker). Having the current and voltage signals decomposed may enable health monitoring and predictive maintenance. It may be necessary to isolate relevant sensor signatures and/or to extract and analyze the relevant features. Embodiments of the system 100/method 200 may isolate the electrical signatures (voltage and/or current) of each load/appliance. Each current and voltage profile can then be analyzed and manipulated to detect faults. On an aircraft, for example, the use of the system 100/method 200 can be even more accurate than with some other applications (e.g., a residential application) as a result of the controlled nature of the aircraft environment. For example, some or most aircraft of a certain model and from a specific airline may be very similar and may have very similar appliances/loads 106 that are utilized. Therefore, baseline load disaggregation methods can be defined for each specific aircraft model, electrical circuit, and/or specific appliance/load that is expected to be monitored. Such information may be stored in the ECU 102 and/or in a storage medium to which the ECU 102 is connected (e.g., the ECU 102 may include/have access to a library of load information for aircrafts and/or for airlines). This may improve the accuracy of the system 100/method 200, such as compared to other designs that have been developed exclusively for residential use.

One example of a method of utilizing electrical current signatures to determine faults (e.g., cavitation in pumps) is generally described in U.S. Pat. No. 7,231,319, the disclosure of which is hereby incorporated by reference in its entirety as those fully set forth herein.

Embodiments of the system 100/method 200 may be used, for example and without limitation, in connection with galley equipment of an aircraft, such as a microwave oven, convection oven, toaster, and/or coffee maker, among others. These items may be similar to loads/appliances to those that may be used a residential house and/or similar to the appliances described above. Several of these loads may be routed through circuit breakers in a power source 104 (e.g., an aircraft circuit breaker panel). The system 100 may be built, at least in part, into the circuit breaker panel to monitor specific electrical circuits and/or loads 106.

Proper functioning of loads/appliances 106 of an aircraft may be even more important than for other applications (e.g., residential application). While a failure of a single appliance on an aircraft may not in itself be significant, it may be important to identify the failure and to prevent any further damage to other aircraft systems and/to conduct a repair in time for the next flight. Embodiments of the system 100/method 200 may facilitate identifying incorrect operation and potential failure before the actual occurrence of the failure (e.g., if a power profile of that appliance, as disaggregated, is abnormal). This may give valuable time to airline operations to plan and to replace the faulty appliance. The system 100/method 200 (e.g., the ECU 102) may use information about the faulty appliance to shut down the appliance remotely prior to further problems developing that could affect other aircraft systems.

Instead of having each load/appliance 106 with separate hardware to monitor itself or connecting a separate monitor to each load/appliance 106, embodiments of the system 100 may be implemented in a central location to monitor a plurality of loads, such as at a circuit breaker panel 104, which may simplify the system and/or reduce costs/weight. Loads/appliances 106 themselves may be configured to accept a command signal to turn on/off on demand from the system 100/ECU 102, which may be an output of the method 200 (e.g., an output of load disaggregation 206).

As another example application, embodiments of the system 100/method 200 may be used in connection with a group of aircraft seats and associated electrical equipment. The system 100/method 200 may monitor the seats and equipment from a single location, such as via utilizing load disaggregation 206. Some non-limiting examples of the equipment/loads 106 that may be monitored are entertainment screens, AC power outlets, overhead lights, seat actuators, and/or other electrical loads. As passengers may directly interact with these electrical loads 106, it may be useful/important to ensure proper functioning to maintain a positive passenger experience and passenger satisfaction.

With embodiments, the system 100/method 200 may include a power on/off sequence to turn each load 106 on/off in a specific order, such as to differentiate from several different loads 106 that may be substantially the same and that may be wired to a single circuit breaker. Knowing the order of the sequence, the system 100/method 200 may decompose each of the substantially identical loads 106 (e.g., entertainment screens) from another. Following this disaggregation, the system 100/method 200 may monitor the health status of each individual load (e.g., from a single centralized location for multiple loads).

Similar to the previous two examples, a potential use-case of monitoring aircraft components, such as electric motor driven pumps, is that a group of several motors (loads) may be monitored from a single location. In addition to individual health monitoring, for safety redundant systems, where several components such as pumps may be back-ups of each other, the method/system may turn on/off specific loads/pumps. For example, if one of the pumps is found to be defective through the health monitoring of the method/system, the system 100/method 200 may disable the defective pump so as to not create further damage to the pump or the aircraft. In the meantime, the system 100/method 200 may turn on another back-up pump to compensate for the pump that was taken offline.

In examples, an ECU may include an electronic controller and/or include an electronic processor, such as a programmable microprocessor and/or microcontroller. In embodiments, an ECU may include, for example, an application specific integrated circuit (ASIC). An ECU may include a central processing unit (CPU), a memory (e.g., a non-transitory computer-readable storage medium), and/or an input/output (I/O) interface. An ECU may be configured to perform various functions, including those described in greater detail herein, with appropriate programming instructions and/or code embodied in software, hardware, and/or other medium. In embodiments, an ECU may include a plurality of controllers. In embodiments, an ECU may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method of monitoring an electrical system having a plurality of electrical loads, the method comprising:
   operating the plurality of electrical loads;
   obtaining a combined power profile for the plurality of electrical loads;
   decomposing the combined power profile into individual electrical load profiles; and
   controlling operation of one or more electrical loads of the plurality of electrical loads according to the individual electrical load profile of the one or more electrical loads;
   wherein decomposing the combined power profile includes:
      applying multi-dimensional event decomposition to the combined power profile to identify and disaggregate the combined power profile into the individual electrical load profiles;
      detecting power consumption events of the plurality of electrical loads; and
      classifying the detected power consumption events.

2. The method of claim 1, wherein decomposing the combined power profile includes event clustering, event clustering including:
   determining a Mahaloanobis distance between a newly detected event and one or more existing event clusters;
   assigning the newly detected event to an event cluster of the one or more existing event clusters if the Mahaloanobis distance is less than or equal to an event clustering threshold; and
   creating a new event cluster and assigning the newly detected event to the new event cluster if the Mahaloanobis distance is greater than the event clustering threshold.

3. The method of claim 1, wherein decomposing the combined power profile includes an electronic control unit conducting:
   a statistical significance assessment;
   an event cluster type assessment;
   a transition probability determination;
   an event cluster leading type determination; and
   an event cluster status assessment to determine an event cluster status according to information from the statistical significance assessment, the event cluster type assessment, the transition probability determination, and the event cluster leading type determination.

4. The method of claim 1, wherein decomposing the combined power profile includes an electronic control unit conducting event cluster rearrangement; and event cluster rearrangement includes removing event clusters having a status of abandoned.

5. The method of claim 1, wherein operating the plurality of electrical loads includes turning each load of the plurality of loads on and/or off in a predetermined sequence.

6. The method of claim 1, wherein operating the plurality of electrical loads includes providing multi-phase power to the plurality of electrical loads.

7. The method of claim 1, wherein decomposing the combined power profile into individual electrical load profiles includes assigning loads of the plurality of loads to a first load tier, a second load tier, and a third load tier.

8. The method of claim 1, wherein the plurality of electrical loads includes aircraft appliances.

9. An electrical system, comprising:
an electronic control unit;
a power source; and
a plurality of electrical loads connected to the power source;
wherein the electronic control unit is configured to:
obtain a combined power profile for the plurality of electrical loads;
apply multi-dimensional event decomposition to the combined power profile to identify and disaggregate individual electrical load profiles from the combined power profile; and
control operation of one or more electrical loads of the plurality of electrical loads according to the individual electrical device profile of the one or more electrical loads;
wherein the plurality of electrical loads includes vehicle appliances.

10. The electrical system of claim 9, wherein the power source is configured to selectively provide multi-phase power to the plurality of electrical loads.

11. The electrical system of claim 9, wherein the power source includes a circuit breaker panel.

12. A method of monitoring an electrical system having a plurality of electrical loads, the method comprising:
operating the plurality of electrical loads;
obtaining a combined power profile for the plurality of electrical loads;
decomposing the combined power profile into individual electrical load profiles; and
controlling operation of one or more electrical loads of the plurality of electrical loads according to the individual electrical load profile of the one or more electrical loads;
wherein controlling operation of the one or more electrical loads includes (i) predicting an imminent failure of the one or more electrical loads via the individual electrical load profile of the one or more electrical loads, and (ii) switching off the one or more electrical loads.

13. The method of claim 12, wherein decomposing the combined power profile includes applying multi-dimensional event decomposition to the combined power profile to identify and disaggregate the combined power profile into the individual electrical load profiles.

14. The method of claim 13, wherein decomposing the combined power profile includes detecting power consumption events of the plurality of electrical loads.

15. The method of claim 14, wherein detecting power consumption events includes obtaining an event duration, an event sign, an event steady-state feature, and/or an average event waveform for each detected event.

16. The method of claim 15, wherein detecting power consumption events includes detecting a state change if a steady-state feature changes by an amount greater than a first threshold, and detecting a power consumption event if a duration of the state change is greater than a second threshold.

17. The method of claim 14, wherein detecting power consumption events includes detecting events with state durations greater than a state duration threshold and not detecting events with state durations equal to or less than the state duration threshold.

18. The method of claim 14, wherein decomposing the combined power profile includes classifying the detected power consumption events.

19. The method of claim 18, wherein classifying the detected power consumption events includes event clustering and association of the detected power consumption events of each electrical load of the plurality of electrical loads.

20. The method of claim 19, wherein decomposing the combined power profile includes applying progressive load classification and decomposition.

* * * * *